United States Patent
Hasegawa

(10) Patent No.: US 9,338,310 B2
(45) Date of Patent: May 10, 2016

(54) IMAGE PROCESSING APPARATUS AND COMPUTER-READABLE MEDIUM FOR DETERMINING PIXEL VALUE OF A TARGET AREA AND CONVERTING THE PIXEL VALUE TO A SPECIFIED VALUE OF A TARGET IMAGE DATA

(71) Applicant: BROTHER KOGYO KABUSHIKI KAISHA, Nagoya-shi, Aichi-ken (JP)

(72) Inventor: Tomohiko Hasegawa, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/662,434

(22) Filed: Mar. 19, 2015

(65) Prior Publication Data
US 2015/0278661 A1   Oct. 1, 2015

(30) Foreign Application Priority Data

Mar. 28, 2014 (JP) ................................. 2014-070572

(51) Int. Cl.
*G06F 15/00* (2006.01)
*H04N 1/00* (2006.01)

(52) U.S. Cl.
CPC ........................................ *H04N 1/00* (2013.01)

(58) Field of Classification Search
None
See application file for complete search history.

(56) References Cited

U.S. PATENT DOCUMENTS

| 6,034,785 | A * | 3/2000 | Itoh | G06K 15/00 358/1.18 |
| 7,789,311 | B2 * | 9/2010 | Jones | G06K 7/1417 235/487 |
| 8,120,791 | B2 * | 2/2012 | Shirakawa | H04N 1/3871 348/218.1 |
| 8,442,866 | B2 * | 5/2013 | Stone | G06Q 30/0603 705/26.1 |
| 2005/0213174 | A1 | 9/2005 | Maki et al. | |
| 2006/0170968 | A1 | 8/2006 | Maki et al. | |
| 2006/0187477 | A1 | 8/2006 | Maki et al. | |
| 2009/0060364 | A1 * | 3/2009 | Kondo | G06F 17/3025 382/254 |

FOREIGN PATENT DOCUMENTS

| JP | H03-44268 A | 2/1991 |
| JP | 2006-352526 A | 12/2006 |

\* cited by examiner

*Primary Examiner* — Steven Kau
(74) *Attorney, Agent, or Firm* — Scully, Scott, Murphy & Presser, P.C.

(57) ABSTRACT

An image processing apparatus includes a controller that acquires original image data and specifies a plurality of target areas including a first target area and a second target area, and the target areas include background pixels and colored pixels. The controller determines pixel values of first colored pixels, respectively, the pixel value representing a color of the first colored pixel; determines a first conversion pixel value based on the pixel values of the first colored pixels; determines pixel values of second colored pixels, respectively, the pixel value representing a color of the second colored pixel; and determines a second conversion pixel value based on the pixel values of the second colored pixels. The controller converts the pixel value of every pixel included in each of the first target area and the second target area into each of the first conversion pixel value and the second conversion pixel value.

13 Claims, 16 Drawing Sheets

IMAGE PROCESSING APPARATUS AND COMPUTER-READABLE MEDIUM FOR DETERMINING PIXEL VALUE OF A TARGET AREA AND CONVERTING THE PIXEL VALUE TO A SPECIFIED VALUE OF A TARGET IMAGE DATA

CROSS-REFERENCE TO RELATED APPLICATION

This application claims priority from Japanese Patent Application No. 2014-070572 filed on Mar. 28, 2014, the entire subject matter of which is incorporated herein by reference.

TECHNICAL FIELD

This disclosure relates to an image processing technology for converting the values of a plurality of pixels of an original image.

BACKGROUND

There is a technology for performing image processing on target image data such as scan data and outputting the processed image data. For example, there has been disclosed a technology for synthesizing scan data representing a scan image including a word bubble containing letters and photographic image data representing a photographic image. In this technology, an image obtained by coloring the inside of the word bubble of the scan image white, the letters of the inside of the word bubble, and the photographic image are synthesized, and processed image data representing the synthetic image is output. As a result, it is possible to output processed image data representing attractive images.

As described above, There is needs of a technology for outputting image data representing attractive images.

SUMMARY

This disclosure is to provide a new technology for outputting processed image data representing attractive images.

This disclosure was made for solving at least a part of the above-mentioned problem and can be implemented as the following application example.

FIRST APPLICATION EXAMPLE

In a first application example, an image processing apparatus includes a controller configured to perform: acquiring original image data representing an original image; specifying a plurality of target areas, which is included in the original image and includes a first target area and a second target area, wherein the first target area includes background pixels and first colored pixels, the background pixels representing a background color of the original image, the first colored pixels representing colors different from the background color, wherein the second target area includes the background pixels and second colored pixels, the second colored pixels representing colors different from the background color; determining pixel values of first colored pixels, respectively, the pixel value representing a color of the first colored pixel; determining a first conversion pixel value, which is to be applied for every pixels in the first target area, based on the pixel values of the first colored pixels; determining pixel values of second colored pixels, respectively, the pixel value representing a color of the second colored pixel; determining a second conversion pixel value, which is to be applied for every pixels in the second target area, based on the pixel values of the second colored pixels, the second conversion pixel value being different from the first conversion pixel value; converting the pixel value of every pixel included in each of the first target area and the second target area into each of the first conversion pixel value and the second conversion pixel value and generating processed image data representing a processed image; and outputting the processed image data.

According to the above described configuration, the plurality of kinds of pixel values of the first target area and the plurality of kinds of pixel values of the second target area are converted into the pixel values determined using the pixel values of the first and second target areas, respectively. As a result, it is possible to output the processed image data representing the attractive image obtained by appropriately converting the colors of the first and second target areas.

Also, this disclosure can be implemented in various forms such as control methods of image processing apparatuses, computer programs for implementing the apparatuses or the methods, and recording media containing the computer programs.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
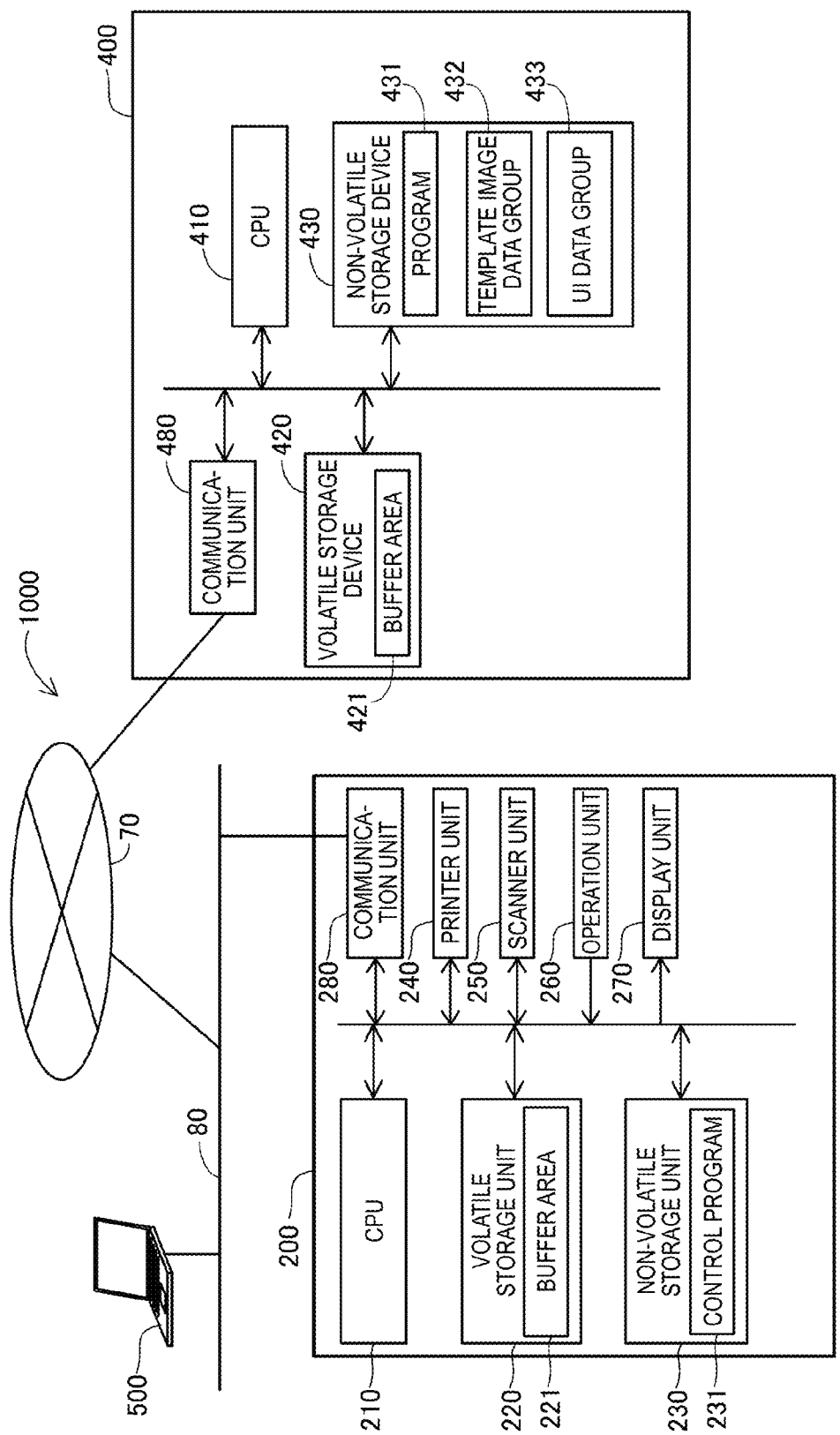
FIG. 1 is a block diagram illustrating the configuration of an image processing system according to a first embodiment.

A. First Embodiment
A-1: Configuration of Image Processing System 1000
FIG. 1 is a block diagram illustrating the configuration of an image processing system according to a first embodiment. An image processing system 1000 includes a server 400, which serves as an image processing apparatus, and a multi-functional peripheral 200. The server 400 is connected to the Internet 70, and the multi-functional peripheral 200 is connected to the Internet 70 through a local area network (LAN) 80. As a result, the server 400 and the multi-functional peripheral 200 can perform communication through the LAN 80 and the Internet 70. Also, a personal computer 500 of a user having the multi-functional peripheral 200 may be connected to the LAN 80.

The server 400 includes a CPU 410, a volatile storage device 420 such as a DRAM, a non-volatile storage device 430 such as a hard disk drive or a flash memory, and a communication unit 480 including an interface for connection with a network such as the Internet 70. The volatile storage device 420 has a buffer area 421 for temporarily storing various intermediate data which are generated when the CPU 410 performs processing. The non-volatile storage device 430 contains a computer program 431, a template image data group 432 including a plurality of template image data, and a UI data group 433.

The computer program 431, the template image data group 432, and the UI data group 433 are uploaded to the server 400 through the Internet 70, thereby being installed in the server 400, for example, by the administrator of the server 400. Alternatively, the computer program 431, the template image data group 432, and the UI data group 433 may be supplied in a state where they are contained in a recording medium such as a DVD-ROM, and the administrator of the server 400 may install them in the server 400. The CPU 410 executes the computer program 431, thereby implementing image processing to be described below.

Figure 2:
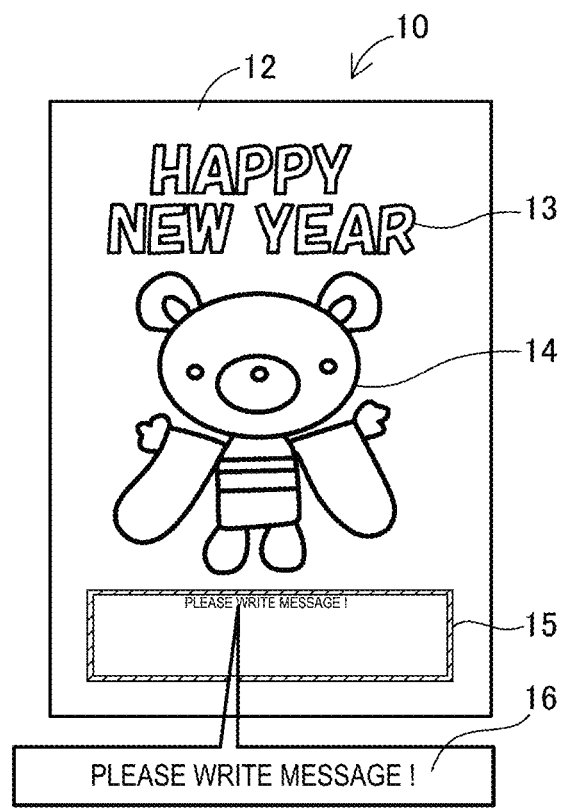
FIG. 2 is a view illustrating an example of a template image.

FIG. 2 is a view illustrating an example of a template image 10 which is represented by a template image data included in the template image data group 432.

A template image data is, for example, a RGB image data. In the example of FIG. 2, the template image 10 is printed, for example, on an A4-size paper sheet, and thereby a user may use the template image to create an image document to be printed on a postcard. The user can color the template image 10 printed on the paper sheet with colored pencils, marker pens, and the like, and/or can write letters on the template image 10, thereby creating a document.

The template image 10 includes a background 12, a draft image 13 having a letter shape, a draft image 14 having a predetermined character shape, a guide line 15 indicating an area for the user to write letters, and a message 16 for notifying the user to write letters. The guide line 15 and the message 16 are objects to be removed by an unnecessary-portion removing process (to be described below). The draft images 13 and 14 are objects not to be removed by the unnecessary-portion removing process (to be described below). Each of the guide line 15 and the message 16 is a monochromatic object having a specific color (an achromatic color having a relatively high luminance value in the present embodiment). For example, in a case where luminance values are represented by 256 grayscale values of 0 to 255, the specific color is an achromatic color having an luminance value Y within a range from 100 to 200. Each of the draft images 13 and 14 has a color different from the specific color of the guide line 15 or the message 16. For example, each draft image has an achromatic color having a relatively low luminance value, for example, an achromatic color having an luminance value Y within a range from 0 to 50.

The multi-functional peripheral 200 includes a CPU 210, a volatile storage unit 220 such as a DRAM, a non-volatile storage unit 230 such as a flash memory or a hard disk drive, a printer unit 240, a scanner unit 250, an operation unit 260 such as a touch panel and buttons, a display unit 270 such as a liquid crystal display, and a communication unit 280 for performing communication with an external device. For example, the communication unit 280 includes an interface for connection with a network such as the LAN 80 and an interface for connection with an external storage device (for example, a USB memory).

The volatile storage unit 220 has a buffer area 221 for temporarily storing various data which is generated when the CPU 210 performs processing. The non-volatile storage unit 230 contains a control program 231.

The printer unit 240 uses a printing scheme such as an inkjet scheme or a laser scheme to perform printing. The scanner unit 250 uses photoelectric conversion elements (for example, CCDs or CMOSs) to optically reads documents, thereby generating scan data.

The CPU 210 executes the control program 231, thereby performing control on the multi-functional peripheral 200. For example, the CPU 210 controls the printer unit 240 and the scanner unit 250 such that they perform a copying process, a printing process, a scanning process, or the like. Further, the CPU 210 can access the server 400 and perform a service using process of using a service which is provided by the server 400.

A-2: Operation of Image Processing System 1000

In response to that the multi-functional peripheral 200 optically reads a template image, acquires scan data, and makes a request as a client, the CPU 410 of the server 400 performs image processing (to be described below) on the scan data. As a result, processed image data is generated. In the present embodiment, that image processing is performed for implementing an image generating service to be provided to the client by the server 400. Hereinafter, an operation of the image processing system 1000 including the image generating service to be provided by the server 400 will be described.

Figure 3:
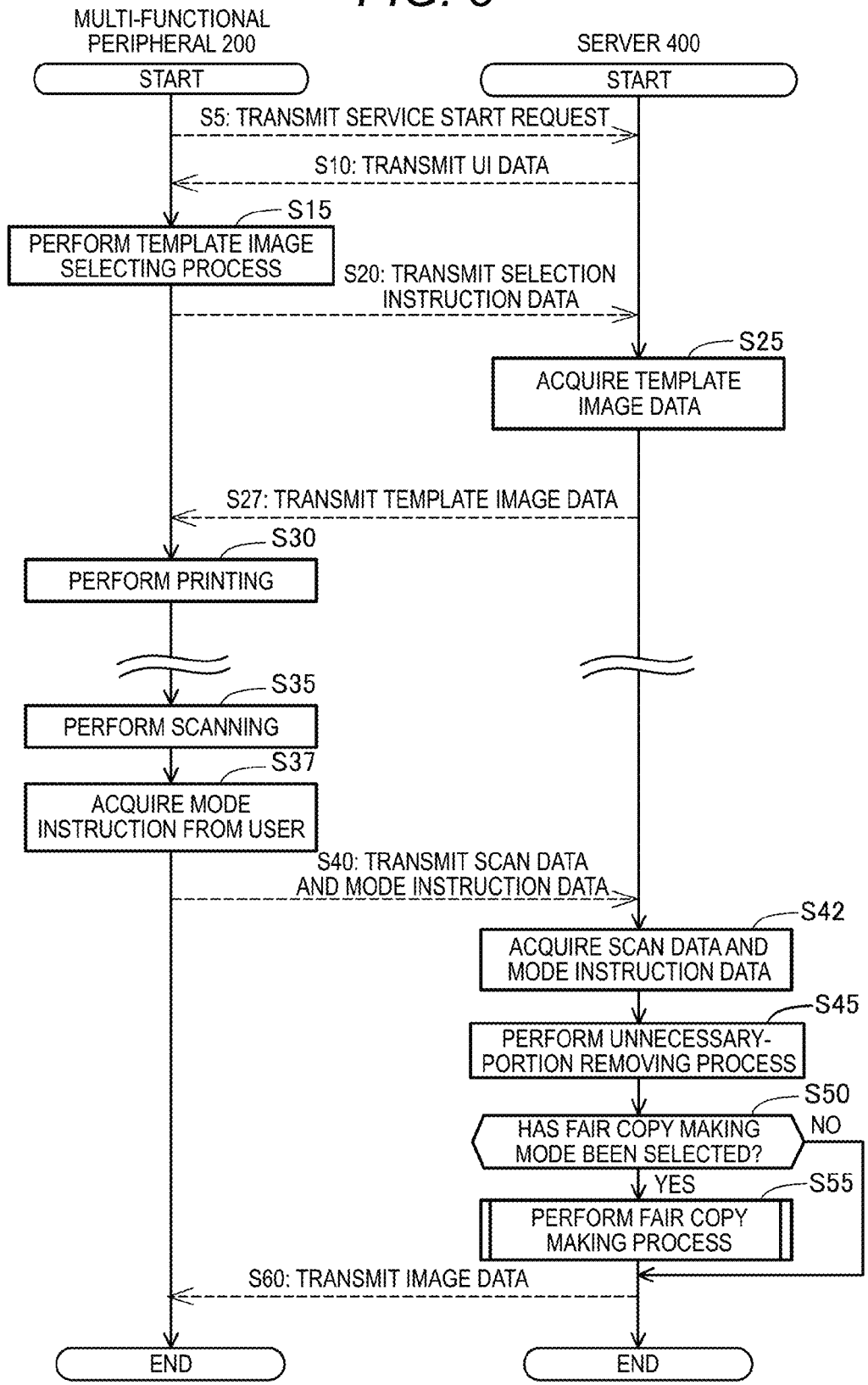
FIG. 3 is a flow chart illustrating an operation of the image processing system.

FIG. 3 is a flow chart illustrating the operation of the image processing system 1000. The process of the flow chart starts if the multi-functional peripheral 200 receives an instruction for using the image generating service of the server 400. The image generating service is specifically a service of generating an image to be printed on a postcard (for example, a New Year's card) using scan data generated by the scanner unit 250. Scan data is, for example, RGB image data.

When the process starts, in Step S5, the CPU 210 of the multi-functional peripheral 200 transmits a service start request to the server 400. If the service start request is received, in Step S10, the CPU 210 of the multi-functional peripheral 200 selects a UI data necessary to provide the image generating service, from the UI data group 433 (FIG. 1), and transmits the corresponding UI data to the multi-functional peripheral 200. Specifically, the UI data includes various screen data necessary to display user interface screens (hereinafter, also referred to as UI screens), and control data. The control data includes, for example, various data necessary for the multi-functional peripheral 200 to use the UI screens to perform a predetermined process (specifically, the process of Step S15 to be described below). For example, the control data includes information representing a process (for example, a process of transmitting selection instruction data to the server 400) which the multi-functional peripheral 200 should perform according to a user's instruction received through a UI screen (for example, FIG. 4).

In Step S15, the CPU 210 performs a template image selecting process according to the received UI data. The template image selecting process is a process of receiving an instruction for selecting a template image (to be described below), from the user.

Figure 4:
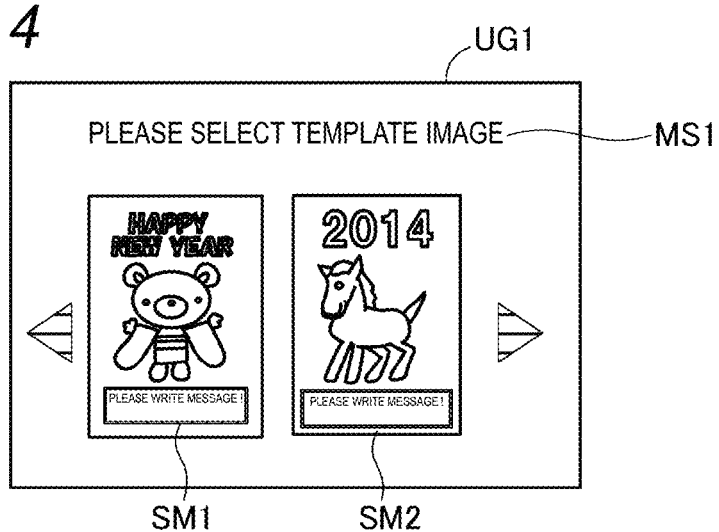
FIG. 4 is a view illustrating an example of a UI image.

FIG. 4 is a view illustrating an example of a UI screen. First, the CPU 210 displays a UI screen UG1 of FIG. 4 on the display unit 270, and receives an instruction for selecting a template image to be used, from the user. For example, the UI screen UG1 includes a plurality of thumbnail images SM1 and SM2 representing a plurality of selectable template images, and a message MS1 for urging selection of a template image. The UI screen UG1 and an image data group representing the thumbnail images SM1 and SM2 are contained in the UI data received from the server 400.

In Step S20, the CPU 210 transmits selection instruction data including information designating a template image selected by the user, to the server 400.

In Step S25, according to the received selection instruction data, the CPU 410 of the server 400 acquires a template image data representing the template image selected by the user, from the template image data group 432 (FIG. 1) stored in the non-volatile storage device 430. The template image data may be acquired from an external device, for example, another server connected to the server 400, or an external storage device. Also, on the assumption that the template image 10 shown in FIG. 2 has been selected, the subsequent process will be described.

In Step S27, the CPU 410 transmits the acquired template image data to the multi-functional peripheral 200. In Step S30, the CPU 210 of the multi-functional peripheral 200 controls the printer unit 240 such that, according to the received template image data, the printer unit 240 prints the template image 10 of FIG. 2 on a paper sheet.

The user colors the template image 10 printed on the paper sheet and/or writes letters on the template image, thereby creating a document. In Step S35, the CPU 210 of the multi-functional peripheral 200 controls the scanner unit 250 such that the scanner unit optically reads the document created by the user, thereby generating scan data as original image data.

Figure 5:
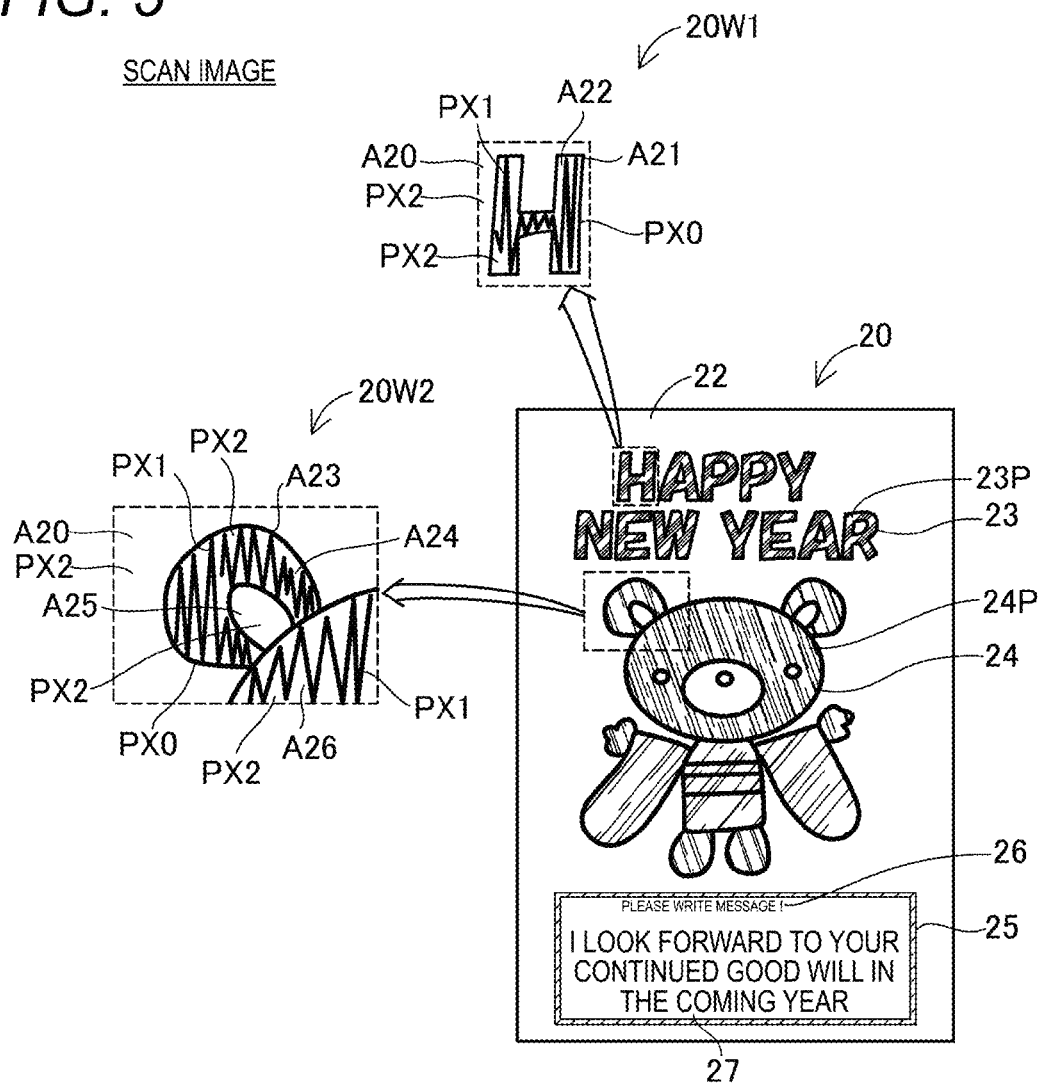
FIG. 5 is a view illustrating an example of a scan image which is represented by scan data.

FIG. 5 is a view illustrating an example of a scan image 20 which is represented by scan data. The scan image 20 can also be referred to as the template image 10 subjected to coloring and/or letter writing by the user. Like the template image 10, the scan image 20 includes a background 22, draft images 23 and 24, a guide line 25, and a message 26 as shown in FIG. 5. The scan image 20 further includes portions 23P and 24P colored by the user, and letters 27 written by the user.

In FIG. 5, there is shown an enlarged view of a portion 20W1 of the draft image 23 of the scan image 20. The enlarged portion 20W1 includes an area A20 corresponding to the background 22, an area A21 constituting a closed curve forming the contour of a letter "H" of the draft image 23, and an area A22 surrounded by the closed curve.

These areas A20 to A22 are composed by a plurality of draft-image constituting pixels PX0 constituting the draft image 23, a plurality of colored pixels PX1 constituting a portion colored with colored pencils, marker pens, or the like by the user, and a plurality of uncolored pixels PX2 constituting an uncolored portion (a portion having the color of the background).

In a case where a user colors a document, in general, color irregularity occurs. For this reason, the colored portion 23P is likely to be in a state where there are colored pixels PX1 and uncolored pixels PX2 together, rather than being in a state where there are only colored pixels PX1.

In FIG. 5, there is also shown an enlarged view of a portion 20W2 of the draft image 24 of the scan image 20. The enlarged portion 20W2 includes an area A20 corresponding to the background 22, an area A23 constituting closed curves, and areas A24 to A26 surrounded by the closed curves. The area A23 constituting the closed curves is a portion of the draft image 24 and is composed by a plurality of draft-image constituting pixels PX0. The areas A24 and A26 surrounded by closed curves are parts of the colored portion 24P and are composed by a plurality of colored pixels PX1 and a plurality of uncolored pixels PX2. The area A25 surrounded by a closed curve is an area representing a part having not been colored by the user and is composed by a plurality of uncolored pixels PX2.

Areas composed by the draft-image constituting pixels PX0, specifically, the areas A21 and A23 constituting the closed curves are also referred to as draft image areas. Among areas surrounded by the areas constituting the closed curves, areas constituting the colored portions 23P and 24P, specifically, the areas A22, A24, and A26 are also referred to as colored areas. As described above, each colored area includes a plurality of colored pixels PX1 and a plurality of uncolored pixels PX2. The area A20 corresponding to the background 22, and the area A25 which is one of the areas surrounded by the area, which is constituting the closed curves and does not constitute the colored portions 23P and 24P, are also referred to as uncolored areas. Each uncolored areas includes a plurality of uncolored pixels PX2.

The colored pixels PX1 (for example, the colored pixels PX1 of the area A22) of the colored portion 23P have a color different from the color of the colored pixels PX1 (for example, the colored pixels PX1 of the areas A24 and A26) of the colored portion 24P.

The area A20 corresponding to the background 22 and the uncolored area A25 are composed of a plurality of uncolored pixels PX2 as described above. However, the user may write letters or erroneously color the area A20 or A25, whereby the area A20 or A25 can include colored pixels PX1.

If the scan data is generated, subsequently, in Step S37, the CPU 210 acquires an instruction for selecting an operation mode for image processing (Steps S45 to S55 to be described below) to be performed by the server 400, from the user. Specifically, the CPU 210 displays a predetermined UI screen on the display unit 270, and acquires an instruction for selecting any one operation mode of a clean copy making mode and a normal mode, from the user.

In Step S40, the CPU 210 transmits the scan data generated in Step S35, and mode instruction data representing the operation mode selected by the selection instruction acquired in Step S37, to the server 400. That is, the mode instruction data is data representing the operation mode selected from the clean copy making mode and the normal mode by the user. As a result, in Step S42, the CPU 410 of the server 400 acquires the scan data and the mode instruction data.

In Step S45, the CPU 410 performs an unnecessary-portion removing process. The unnecessary-portion removing process is a process of removing the guide line 25 and the message 26 described above, from the scan image 20 which is the process target. As described above, the colors of the guide line 25 and the message 26 are achromatic colors having comparatively high luminance values, that is, light gray colors, and are different from the colors of the other objects 23, 24, 23P, 24P, and 27. For example, the CPU 410 computes the luminance values Y and saturation values C of the pixels of the scan image 20. The luminance values Y and the saturation values C computed are expressed by one of 256 grayscale values from 0 to 255. If there is any pixel having a color having an luminance value Y within a specific range (for example, an luminance range from 100 to 200) and having a saturation value C equal to or less than a reference value Cth (for example, 20), the CPU 410 updates the value of the corresponding pixel with a value representing the color of the background (for example, a value representing white). As a result, from the scan image 20, the guide line 25 and the message 26 are removed.

In Step S50, based on the mode instruction data acquired in Step S42, the CPU 410 determines whether the operation mode selected by the user is the clean copy making mode or the normal mode. In a case where the operation mode selected by the user is the clean copy making mode ("YES" in Step S50), in Step S55, the CPU 410 performs a clean copy making process on the scan data having been subjected to the unnecessary-portion removing process. In a case where the operation mode selected by the user is not the clean copy making mode, that is, in a case where the selected operation mode is the normal mode ("NO" in Step S50), the CPU 410 skips Step S55.

Figure 6:
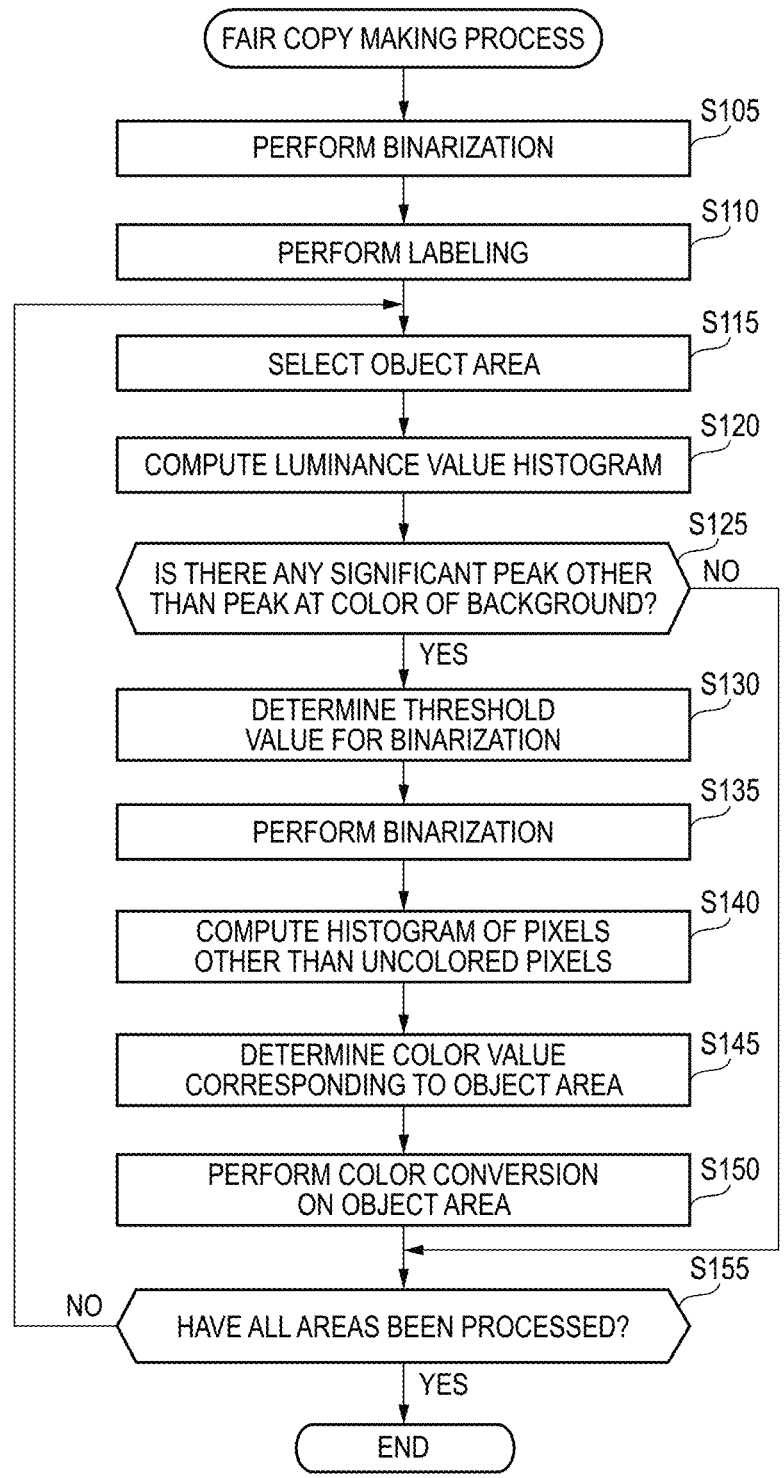
FIG. 6 is a flow chart illustrating a clean copy making process of the first embodiment.

FIG. 6 is the flow chart of the clean copy making process. The clean copy making process is a process of converting the colors of areas (that is, the colored portions 23P and 24P) colored by the user and having color irregularity, into uniform colors. In Step S105, the CPU 410 binarizes the values of the pixels of the scan image 20, thereby generating binary image data. As a result, the plurality of pixels of the scan image 20 is classified into draft-image constituting pixels PX0 constituting the draft images 23 and 24 and the other pixels (also referred to as draft-image non-constituting pixels). The draft-image non-constituting pixels include the background 22, and the colored pixels PX1 and the uncolored pixels PX2 constituting the areas colored by the user (the colored portions 23P and 24P, the letters 27, and the like). As described above, the colors of the draft images 23 and 24 are colors having comparatively low luminance values, that is, black or gray close to black. For example, if any pixel has a color having an luminance value Y equal to or less than a reference value Yth (for example, 50) and a saturation value C equal to or less than the reference value Cth (for example, 20), the CPU 410 classifies the corresponding pixel into a draft-image constituting pixel PX0. Also, if any pixel has a color having an luminance value Y exceeding the reference value Yth or a saturation value C exceeding the reference value Cth, the CPU 410 classifies the corresponding pixel into a draft-image non-constituting pixel.

Figure 7:
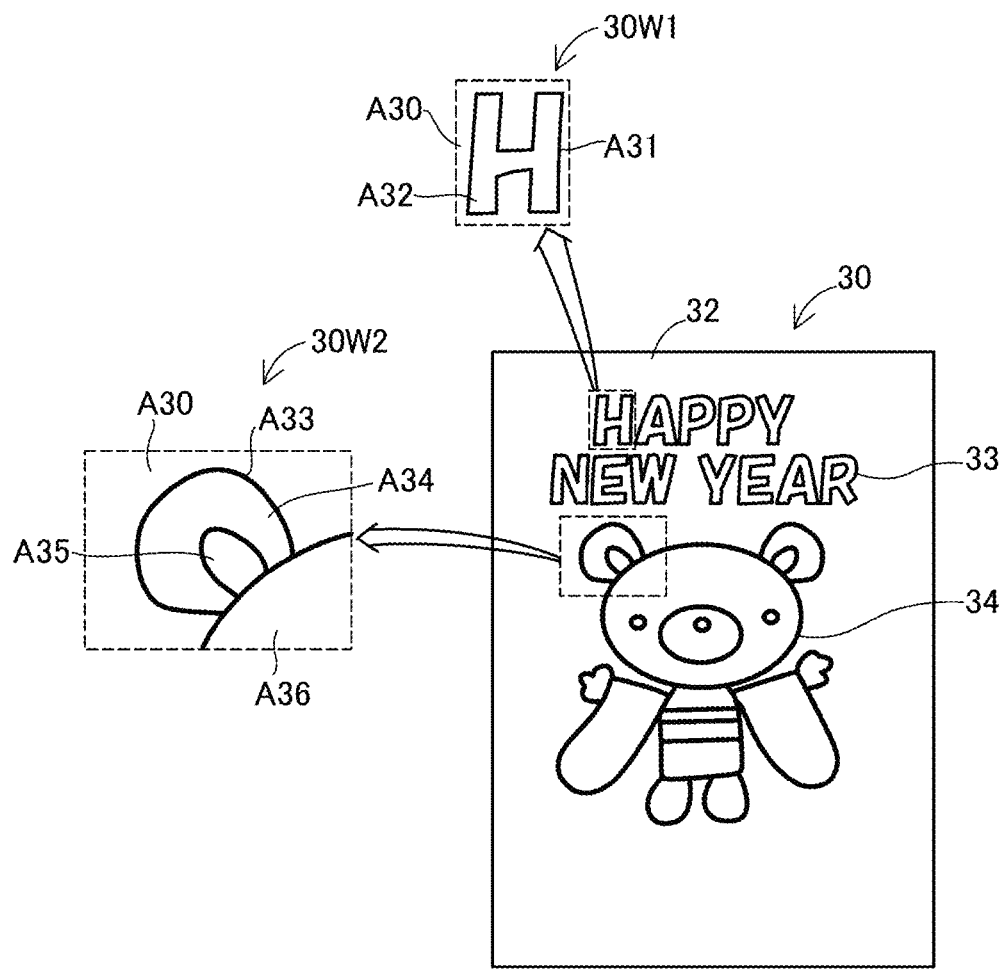
FIG. 7 is a view illustrating an example of a binary image.

FIG. 7 is a view illustrating an example of a binary image 30 which is represented by the binary image data which is generated in Step S105. Black areas 33 and 34 of the binary image 30 of FIG. 7 correspond to areas which are composed of the draft-image constituting pixels PX0 of the scan image 20. A white area 32 of the binary image 30 corresponds to an area which is composed of the draft-image non-constituting pixels (colored pixels PX1 or uncolored pixels PX2) of the scan image 20.

In Step S110 of FIG. 6, the CPU 410 performs labeling on the binary image data. Specifically, the CPU 410 assigns the same identifier to a plurality of successive pixels classified into the same kind. That is, an area which is composed of a plurality of successive draft-image constituting pixels PX0 is specified as one area, and an area which is composed of a plurality of successive draft-image non-constituting pixels is specified as one area. In this way, in the scan image 20, a plurality of areas is specified. In Steps S105 and S110, areas included the scan image 20 are appropriately specified as process targets of the processes of Steps S115 to S150 (to be described below).

For example, in FIG. 7, there are shown enlarged views of portion 30W1 and 30W2 of the binary image 30. In the enlarged portions 30W1 and 30W2, areas A30 to A36 corresponding to the areas A20 to A26 (FIG. 5) included in the scan image 20 are specified. That is, using the binary image 30 of FIG. 7, the areas A20 to A26 included in the scan image 20 of FIG. 5 are appropriately specified. The binary image 30 of FIG. 7 is used only to specify the areas A20 to A26 included in the scan image 20 of FIG. 5, and the following processes for color conversion are performed on the scan data representing the scan image 20 of FIG. 5. Hereinafter, the areas included in the scan image 20 will be described with reference to FIG. 5.

If a plurality of internal areas included in the scan image 20 is specified, in Step S115 of FIG. 6, the CPU 410 selects one object area from the plurality of areas specified in the scan image 20. In the present embodiment, all of the plurality of areas specified in the scan image 20 except for the area A20 corresponding to the background 22, that is, the area A20 including the outer edge of the scan image 20 become selection objects of Step S115. That is, the areas A21 to A26 of FIG. 5 become selection objects.

Figure 8A:
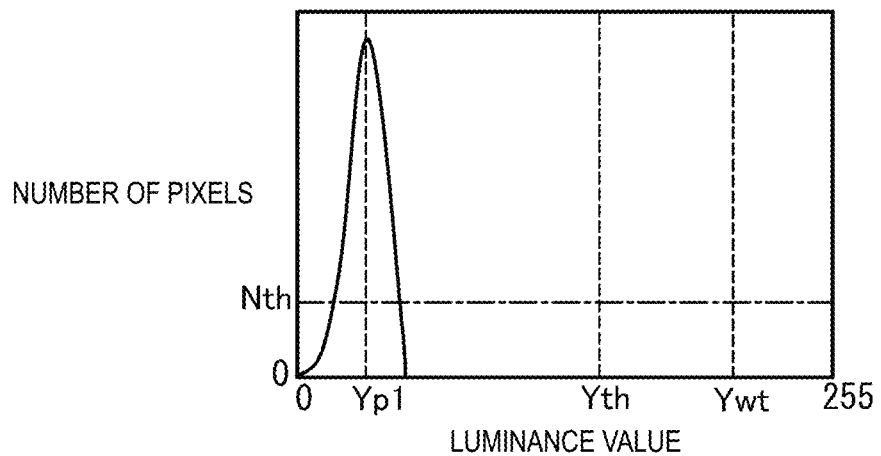
FIGS. 8A to 8C are views illustrating examples of histograms representing the distributions of luminance values.
Figure 8B:
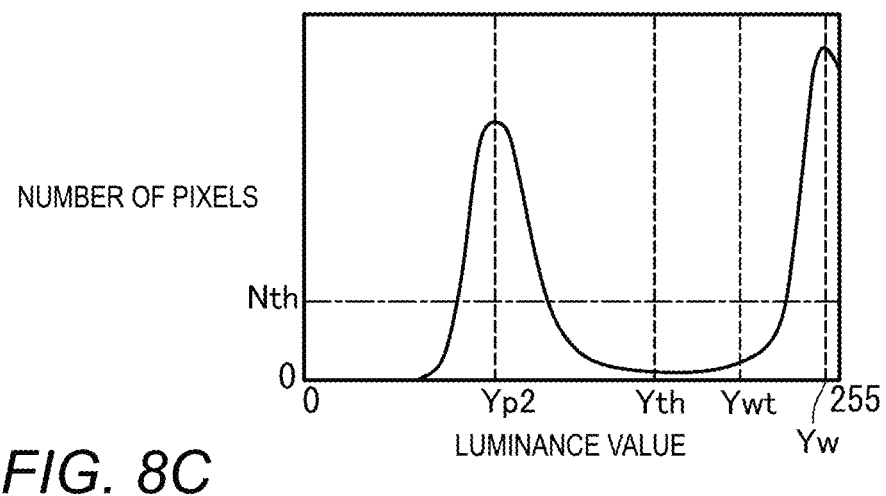
Figure 8C:
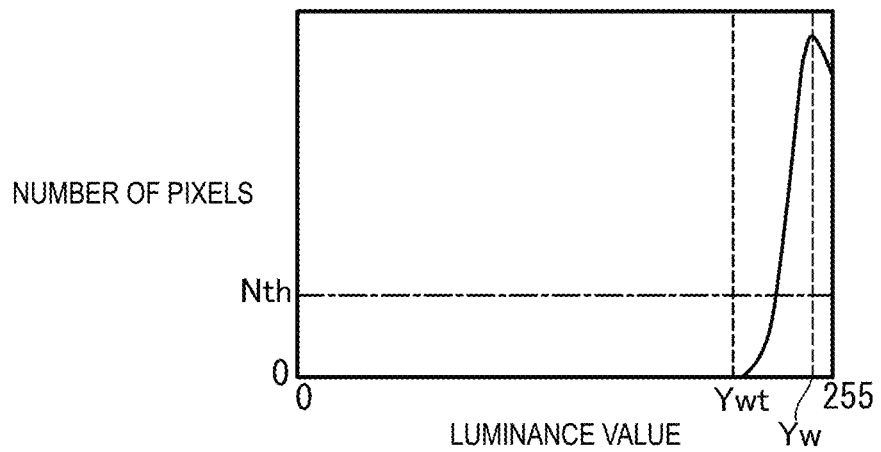

In Step S120 of FIG. 6, the CPU 410 generates a histogram representing the distribution of the luminance values Y of all pixels of the object area. FIGS. 8A to 8c are views illustrating examples of a histogram of the distribution of luminance values Y. These histograms are obtained by taking luminance values Y (in the present embodiment, 256 grayscale values) on the horizontal axis and plotting the number of pixels having each luminance value.

The histogram of FIG. 8A is an example of a histogram of a draft image area (for example, the area A21 or A23 of FIG. 5). The colors of a draft image area are colors close to black. Therefore, in the histogram of a draft image area, as shown in FIG. 8A, a peak is shown at a color close to black (a peak is shown at an luminance value Yp1 in FIG. 8A). Also, in the histogram of a draft image area, at the color of the background (white or a color close to white), a peak is not shown.

The histogram of FIG. 8B is an example of a colored area (for example, the area A22, A24, or A26 of FIG. 5). As described above, a colored area includes a plurality of colored pixels PX1 and a plurality of uncolored pixels PX2. Therefore, in the histogram of a colored area, a peak is shown at the color of the colored pixels PX1 (a peak at an luminance value Yp2 in FIG. 8B) and another peak is shown at the color peak of the uncolored pixels PX2 (a peak at an luminance value Yw in FIG. 8B). The peak at the color of the uncolored pixels PX2 can also be referred to as the peak at the color of the background, and is in the vicinity of the maximum value "255" of the luminance values in the present embodiment.

The histogram of FIG. 8C is an example of the histogram of an uncolored area (for example, the area A20 or A25 of FIG. 5). As described above, most of an uncolored area is composed of a plurality of uncolored pixels PX2. Therefore, in the histogram of an uncolored area, a peak is shown at the color of uncolored pixels PX2 (a peak at the color of the background). In the histogram of an uncolored area, any peak other than the peak at the color of the background is not substantially shown.

In Step S125 of FIG. 6, the CPU 410 determines whether there is any significant peak other than the peak at the color of the background in the luminance value histogram of the object area. A significant peak means, for example, a substantial peak except a peak of colored pixels PX1 caused by noise or a user's coloring mistake. For example, in a case where the object area is a colored area, in the luminance value histogram, a peak at the color imparted by the user, that is, a peak at the color of a plurality of colored pixels PX1 is shown as a significant peak.

Specifically, the CPU 410 specifies a mode value in a range except for a predetermined range including the above described luminance value Yw (an luminance value range from the luminance value Yw to 255 in FIGS. 8A to 8C), that is, a range except for the color of the background, in the histogram of the object area. Thereafter, the CPU 410 determines whether the specified mode (that is, the height of the peak) is equal to or larger than a threshold value Nth (FIGS. 8A to 8C). The threshold value Nth is dynamically determined for each object area, on the basis of the histogram of the corresponding object area. Specifically, the threshold value Nth is determined to a value obtained by multiplying the total number Ntotal of pixels included in the object area by a predetermined ratio Nratio (Nth=Ntotal×Nratio). In a case where the mode value in the range except for the color of the background is equal to or larger than the threshold value Nth, the CPU 410 determines that there is a significant peak other than the peak at the color of the background. Meanwhile, in a case where the mode value in the range except for the color of the background is smaller than the threshold value Nth, the CPU 410 determines that there is no significant peak other than the peak at the color of the background.

In a case where the object area is a draft image area, since a peak exists at a color close to black, it is determined that there is a significant peak other than the peak at the color of the background (FIG. 8A). In a case where the object area is a colored area, since a peak exists at the color of colored pixels PX1, it is determined that there is a significant peak other than the peak at the color of the background (FIG. 8B). In a case where the object area is an uncolored area, since any peak other the peak at the color of the background does not actually exist, it is determined that there is no significant peak other than the peak at the color of the background (FIG. 8C).

If it is determined that there is a significant peak other than the peak at the color of the background ("YES" in Step S125), the CPU 410 performs a series of processes (Steps S130 to S150) for performing color conversion on the object area. Meanwhile, if it is determined that there is no significant peak other than the peak at the color of the background ("NO" in Step S125), the CPU 410 skips the series of processes (Steps S130 to S150). As a result, the colors of the draft image areas A21 and A23 and the colored areas A22, A24, and A26 are converted. Meanwhile, the color of the uncolored area A25 is not converted.

In Step S130, on the basis of the histogram of the object area, the CPU 410 determines a threshold value Yth for binarization. Specifically, in a case where there is no significant peak other than the peak at the color of the background like in the histogram of a draft image area (FIG. 8A), for example, the threshold value Yth is determined to an intermediate value between the luminance value Yp1 which is the mode value and the maximum value "255" in the range except for the color of the background (Yth=(Yp1+255)/2). Also, in a case where there is a peak at the color of the background like in the histogram of a colored area (FIG. 8B), for example, the threshold value Yth is determined to an intermediate value between the luminance value Yp2 which is the mode value and the luminance value Yw of the color of the background at which the peak exists, in the range except for the color of the background (Yth=(Yp2+Yw)/2).

In Step S135, the CPU 410 binarizes the plurality of pixels included in the object area on the basis of their luminance values with reference to the threshold value determined in Step S130. As a result, the plurality of pixels included in the object area is classified into uncolored pixels PX2 and the other pixels. For example, in a case where the object area is the draft image area A21 or A23, since the draft image area A21 or A23 is composed of only draft-image constituting pixels PX0, all pixels included in the object area are classified into pixels other than uncolored pixels (see FIG. 8A). In a case where the object area is a colored area A22, A24, or A26, since the object area includes a plurality of uncolored pixels PX2 and a plurality of colored pixels PX1, the plurality of colored pixels PX1 included in the object area is classified into pixels other than uncolored pixels (see FIG. 8B).

In Step S140, the CPU 410 generates the histogram of the plurality of pixels other than uncolored pixels of the object area. As shown in FIG. 8A, in a case where the object area is a draft image area, the histogram of a plurality of draft-image constituting pixels PX0 is generated. As shown in FIG. 8B, in a case where the object area is a colored area, the histogram of a plurality of colored pixels PX1 is generated. Also, in Step S140, with respect to R, G, and B components, histograms are individually generated.

Figure 9A:
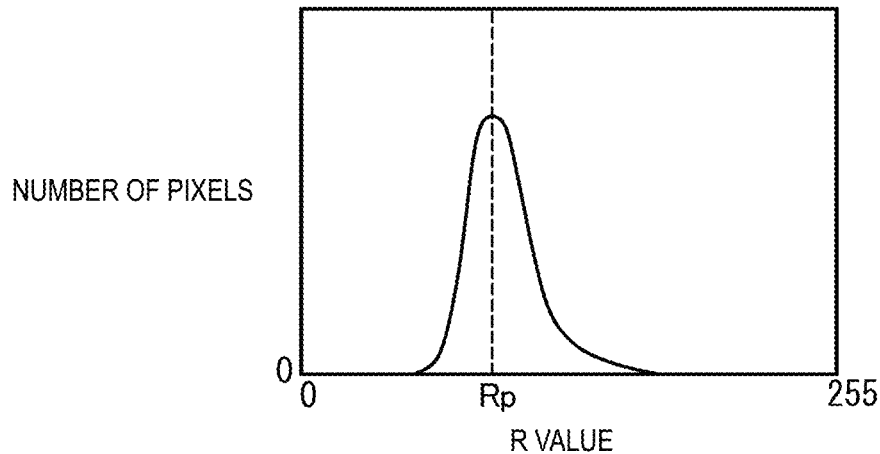
FIGS. 9A to 9C are views illustrating examples of histograms of R, G, and B components, respectively.
Figure 9B:
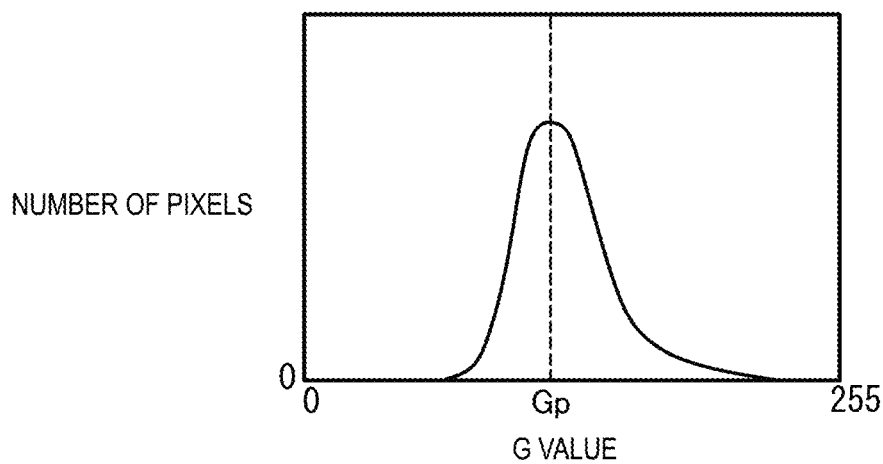
Figure 9C:
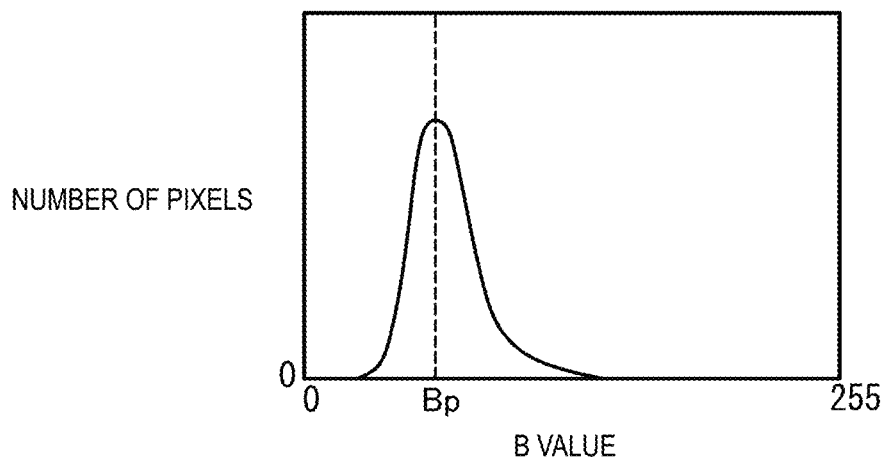

FIGS. 9A to 9c are views illustrating examples of the histograms of R, G, and B components which are generated in a case where the object area is a colored area (FIG. 8B). The three histograms of FIGS. 9A to 9C are histograms of R values, G values, and B values, respectively. The three histograms of FIGS. 9A to 9C show histograms which are generated in a case where the object area is a colored area. In this case, each of the three histograms has a peak of the color of the plurality of colored pixels PX1 of the object area.

In Step S145, on the basis of the histograms of R, G, and B components, the CPU 410 determines a color value corresponding to the object area. Specifically, the CPU 410 specifies component values Rp, Gp, and Bp representing the mode values of the R, G, and B histograms (FIGS. 9A to 9C), respectively. Then, a color value (Rp, Gp, and Bp) including the three component values is determined as the color value corresponding to the object area. That is, a color value including three component values corresponding to the peaks of the three histograms of FIGS. 9A to 9C is determined as the color value corresponding to the object area.

In Step S150, the CPU 410 converts the colors of the object area into a color based on the color value determined in Step S145. That is, the CPU 410 changes the values of all pixels of the object area to the color value determined in Step S145. As a result, the colors of the object area are converted into a single color. That is, the object area becomes a monochromic area having no color irregularity. For example, in a case where the object area is a draft image area, the object area becomes a monochromic area having a color close to black. Also, in a case where the object area is a colored area, the object area becomes a monochromic area having a color based on the unconverted colors of a plurality of colored pixels PX1 of the object area.

In Step S155, the CPU 410 determines whether all process target areas included in the scan image 20 have been processed as object areas. In a case where there is an unprocessed area ("NO" in Step S155), the CPU 410 returns to Step S115 in which the CPU 410 selects the unprocessed area as an object area. In a case where all process target areas have been processed ("YES" in Step S155), the CPU 410 finishes the clean copy making process. When the clean copy making process finishes, processed scan data is generated.

Figure 10:
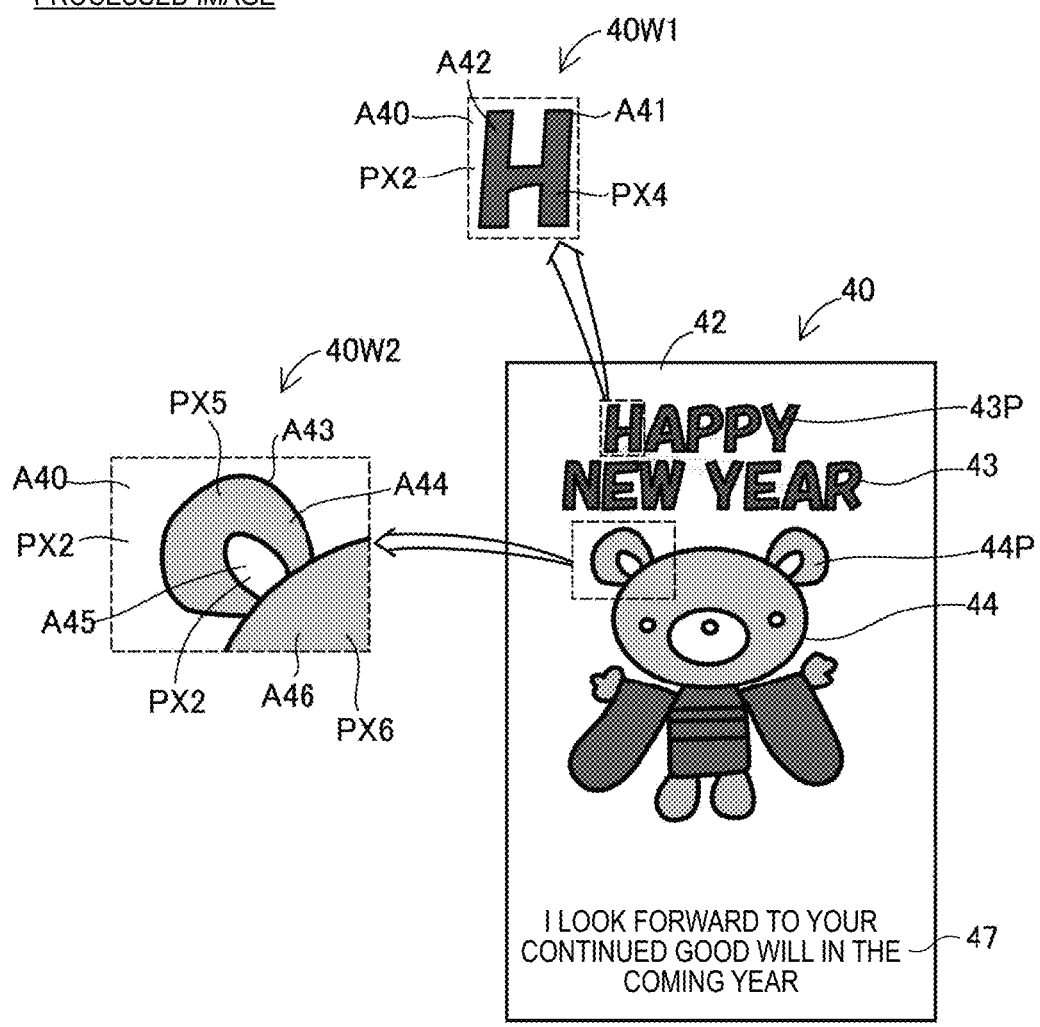
FIG. 10 is a view illustrating an example of a processed image.

FIG. 10 is a view illustrating an example of a processed image which is represented by the processed scan data. Similarly to the unprocessed scan image 20 (FIG. 5), a processed image 40 of FIG. 10 includes a background 42, draft images 43 and 44, colored portions 43P and 44P, and letters 47.

In the colored portions 43P and 44P, each area surrounded by closed curves constituted by a draft image 43 has a single color. For example, as shown in an enlarged portion 40W1 of FIG. 10, a plurality of pixels PX4 constituting a colored area A42 which is a portion of the colored portion 43P has the same color value. Also, as shown in an enlarged portion 40W2 of FIG. 10, a plurality of pixels PX5 constituting a colored area A44 which is a portion of the colored portion 44P has the same color value, and a plurality of pixels PX6 constituting a colored area A46 has the same color value. As a result, the processed image 40 becomes an attractive image as compared to the unprocessed scan image 20. Also, in general, the values of the pixels PX4, the pixels PX5, and the pixels PX6 are different from one another.

Also, each of the draft images 43 and 44 has a single color close to black. That is, a plurality of pixels constituting each of draft image areas A41 and A43 has the same color value as their pixel values. As a result, the processed image 40 becomes an attractive image better as compared to the unprocessed scan image 20.

Also, similar to the unprocessed scan image 20, the processed image 40 includes the letters 47 written on the document by the user.

Also, unlike the unprocessed scan image 20, the processed image 40 does not include the guide line 25 and the message 26. Since unnecessary objects have been removed, the processed image 40 looks better than the unprocessed scan image 20.

In Step S60 of FIG. 3, the CPU 410 transmits the image data to the multi-functional peripheral 200. In a case where the operation mode for image processing is the clean copy making mode, the processed image data generated by the clean copy making process of FIG. 6 is transmitted to the multi-functional peripheral 200. In a case where the operation mode for image processing is the normal mode, since the clean copy making process of FIG. 6 is not performed, the scan data having been subjected to the unnecessary-portion removing process of Step S45 is transmitted to the multi-functional peripheral 200.

If the processed image data or the scan data having been subjected to the unnecessary-portion removing process is received, the CPU 210 of the multi-functional peripheral 200 stores the received image data in the non-volatile storage unit 230 with notifying the user that the image data has been received. The processed image data or the scan data having been subjected to the unnecessary-portion removing process is available to the user. For example, the user controls the multi-functional peripheral 200 such that the multi-functional peripheral 200 prints an image which is represented by the image data, on a paper sheet such as a postcard.

According to the above described embodiment, each of the plurality of colored areas A22, A24, and A26 included in the scan image 20 (FIG. 5) which is the original image is specified in Steps S105 and S110 of FIG. 6. Each of the plurality of colored areas A22, A24, and A26 include a plurality of kinds of pixels expressing different colors, that is, colored pixels PX1 and uncolored pixels PX2 having colors different from the color of the colored pixels PX1 (FIG. 5). Next, a color value corresponding to the colored area A22, that is, a pixel value for expressing a color necessary to be associated with the colored area A22 is determined using the values of a plurality of colored pixels PX1 of the colored area A22 (Steps S140 and S145 of FIG. 6, and FIG. 9). Similarly, a color value corresponding to each of the colored areas A24 and A26, that is, a pixel value for expressing a color necessary to be associated with each of the colored areas A24 and A26 is determined using the values of the plurality of colored pixels PX1 of the corresponding colored area A24 or A26 (Steps S140 and S145 of FIG. 6, and FIG. 9). Thereafter, the color of the colored area A22 is converted into a color based on the color value corresponding to the colored area A22 (Step S150 of FIG. 6). That is, the values of the plurality of kinds of pixels included in the colored area A22 are converted into the color value for expressing the color to be associated with the colored area A22. Similarly, the colors of each of the colored areas A24 and A26 are converted into a color based on the color value corresponding to the corresponding colored area A24 or A26 (Step S150 of FIG. 6). That is, the values of the plurality of kinds of pixels included in each of the colored areas A24 and A26 are converted to a pixel value for expressing a color to be associated with the corresponding colored area A24 or A26. As a result, the processed image data representing the processed image 40 is generated (FIG. 10). Thereafter, the generated processed image data is output (Step S60 of FIG. 3).

As described above, according to the above described embodiment, for example, the values of the plurality of kinds of pixels of each of the colored areas A22 and A24 are converted into the pixel value determined using the values of the plurality of pixels included in the corresponding area A22 or A24. As a result, the processed image data representing the attractive image 40 obtained by appropriately converting the colors of the areas A22 and A24 is output. Specifically, in a case where the document which is the origin of the scan data has color irregularity, in the processed image 40, the color irregularity is eliminated.

Further, according to the above described embodiment, in the clean copy making process, the plurality of pixels included in the scan data is classified into two kinds of pixels (specifically, draft-image constituting pixels PX0 and draft-image non-constituting pixels) on the basis of the values of the pixels (Step S105 of FIG. 6). Next, in the labeling process, a plurality of successive pixels classified into the same kind is specified as one area, whereby each of a plurality of areas included in the scan image 20 is specified (Step S110 of FIG. 6). As a result, in the processes of Steps S115 to S150, areas to be targets of pixel value conversion (specifically, the colored areas A22, A24, and A26 and the like) are appropriately specified. Alternatively, in Step S105, the scan data may be classified into three or more kinds of pixels. For example, the scan data may be classified into three kinds of pixels, that is, draft-image constituting pixels PX0, colored pixels PX1, and uncolored pixels PX2.

Further, according to the above described embodiment, the user is allowed to select the clean copy making mode or the normal mode as an image processing operation mode of the server 400 (Step S37 of FIG. 3). In a case where the clean copy making mode is selected ("YES" in Step S50 of FIG. 3), the processed image data is generated by the clean copy making process (Step S55 of FIG. 3). Meanwhile, in a case where the normal mode is selected ("NO" in Step S50 of FIG. 3), the clean copy making process is not performed, and thus any processed image data is not generated. As a result, according to each operation mode, appropriate image data according to the intention of the user is output. For example, according to the kind of the image in the document, the user may not think that visual quality decreases due to color irregularity in the document and may wants to remain the color irregularity in the document. In this case, the user can select the normal mode, thereby acquiring image data representing an image having desired image quality.

Further, according to the above described embodiment, the histogram of the plurality of colored pixels PX1 included in each of the colored areas such as the areas A22, A24, and A26 is computed (Step S140 of FIG. 6, and FIG. 9). On the basis of the mode value of the computed histogram, a color value corresponding to the corresponding colored area is determined (Step S145 of FIG. 6). As a result, an appropriate color value according to the color distribution of each colored area is determined.

Further, a color value corresponding to each colored area is determined using the values of a plurality of colored pixels PX1 included in the corresponding colored area, without using the values of uncolored pixels PX2. That is, a color value corresponding to each colored area is determined using the values of pixels included in a plurality of pixels constituting the corresponding colored area and being for expressing a specific color, specifically, using the values of a plurality of pixels except for uncolored pixels PX2 having the color of the background. In this way, an appropriate color value corresponding to each colored area is determined using a plurality of pixels except for pixels having the color of the background. Specifically, since influence of the color of the background is eliminated, it is possible to accurately determine color values representing colors imparted by the user.

As described above, the server 400 transmits the template image data to the multi-functional peripheral 200 and controls the multi-functional peripheral 200 serving as a printing performance unit such the multi-functional peripheral 200 prints the template image 10 (FIG. 2) (Steps S27 and S30 of FIG. 3). If the user generates a document by coloring the printed template image 10, and the multi-functional peripheral 200 optically reads the document, thereby generating scan data, the server 400 acquires the scan data (Steps S40 and S42 of FIG. 3). Thereafter, the server 400 converts the values of a plurality of kinds of pixels included in each of the colored areas A22, A24, and A26 on the basis of the colors imparted to the corresponding colored area on the document by the user, thereby generating the processed image data representing the processed image 40 (FIG. 10) (Step S55 of FIG. 3). As a result, on the basis of the document generated by coloring of the user on the printed template image 10, it is possible to generate the processed image data representing the attractive image.

Further, according to the present embodiment, since the area A20 included in the scan image 20 and corresponding to the background 22 is not selected as an object area, the colors of the area A20 is not converted into a single color. As a result, it is possible to suppress the letters 27 written in the scan image 20 from being removed by the clean copy making process.

As can be seen from the above description, for example, the colored area A22 of the present embodiment is an example of a first target area, and the colored area A24 is an example of a second target area. Also, for example, the colored pixels PX1 included in the colored area A22 are examples of first pixels, and the colored pixels PX1 included in the colored area A24 are examples of third pixels. Further, the uncolored pixels PX2 are examples of second pixels. Furthermore, the clean copy making mode is an example of a first mode, and the normal mode is an example of a second mode.

B. Second Embodiment

The configuration of an image processing system of a second embodiment is basically the same as that of the image processing system 1000 (FIG. 1) of the first embodiment, except for the following points.

Figure 11:
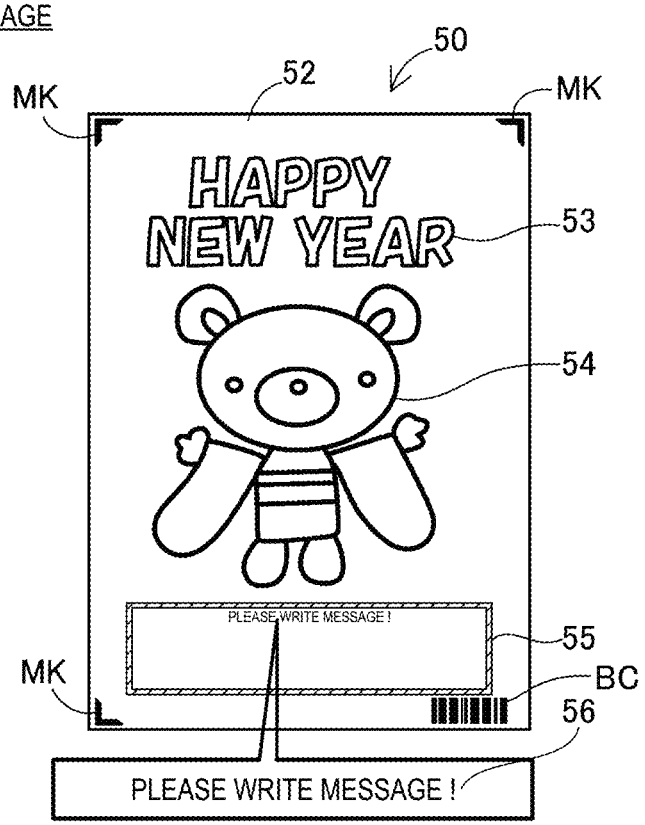
FIG. 11 is a view illustrating an example of a template image of a second embodiment.

First, template image data which are included in a template image data group 432 of the second embodiment are different from those of the first embodiment. FIG. 11 is a view illustrating an example of a template image 50 which is represented by a template image data of the second embodiment. Similarly to the template image 10 of the first embodiment, the template image 50 of FIG. 11 includes a background 52, draft images 53 and 54, a guide line 55, and a message 56. The template image 50 further includes three markers MK disposed at the outer edge portion, specifically, three corner portions, that is, the upper right corner portion, the upper left corner portion, and the lower left corner portion, and a barcode BC disposed at the outer edge portion, specifically, the lower right corner portion. The barcode BC is an image representing information capable of specifying the kind of the template image data, more specifically, a one-dimensional code obtained by coding an identifier identifying the kind of the template image data. Instead of the barcode BC, a two-dimensional code such as a QR code (registered as a trade mark) may be used, or letters such as a number or English letters representing the identifier may be used.

Figure 12:
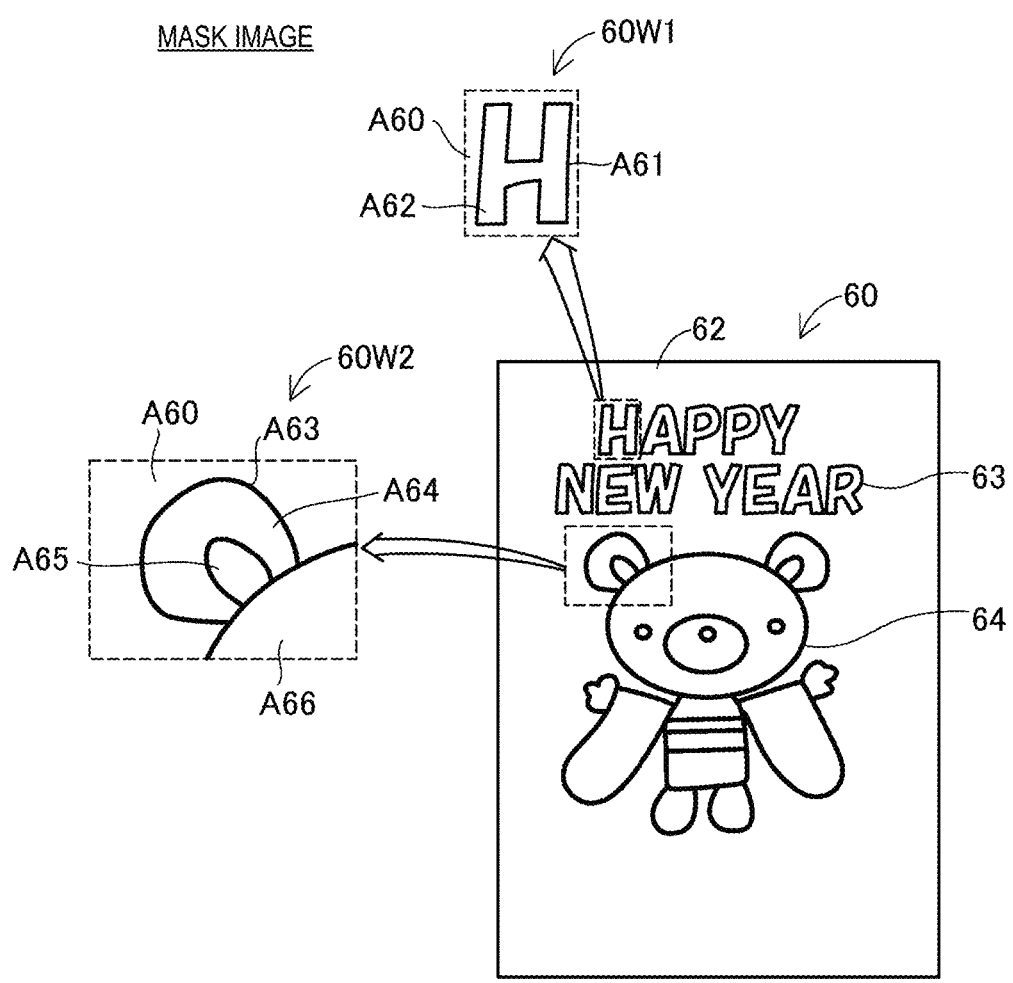
FIG. 12 is a view illustrating an example of an image.

Further, the non-volatile storage device 430 of the server 400 of the second embodiment contains mask data corresponding respectively to the template image data included in the template image data group 432 (not shown in FIG. 1). FIG. 12 is a view illustrating an example of a mask image 60 which is represented by a mask data. For example, the mask image 60 has the same size as that of the template image 50 of FIG. 11 (the same numbers of pixels in the longitudinal direction and the transverse direction as those of the template image 50). A plurality of pixels included in the mask image 60 is classified into draft-image constituting pixels constituting the draft images 53 and 54 included in the template image 50, and the other pixels. Black areas 63 and 64 included in the mask image 60 of FIG. 12 correspond to areas which are included in the template image 50 and where the draft images 53 and 54 has been disposed. A white area 62 included in the mask image 60 of FIG. 12 corresponds to an area which is included in the template image 50 and where the draft images 53 and 54 have not been disposed, that is, an area which is composed of draft-image non-constituting pixels.

In the mask image 60, an area, which is composed of a plurality of draft-image constituting pixels, and an area, which is composed of a plurality of draft-image non-constituting pixels, are labeled similarly to the labeled binary image 30 (FIG. 7) of the first embodiment. Specifically, as shown in enlarged portions 60W1 and 60W2 of FIG. 12, the mask image 60 includes areas A60 to A66 specified by the labeling. The area A60 is an area corresponding to the background 52 of the template image 50. The areas A61 and A63 are areas corresponding to closed curves which are portions of the draft images 53 and 54 of the template image 50. The areas A62, A64, A65, and A66 are areas corresponding to areas surrounded by the closed curves of the template image 50. Since it is possible to specify areas included in the template image 50 and corresponding to the areas A60 to A66 of the mask image 60 with reference to the mask image 60, the mask data can be referred to as information representing a plurality of areas included in the template image 50.

Figure 13:
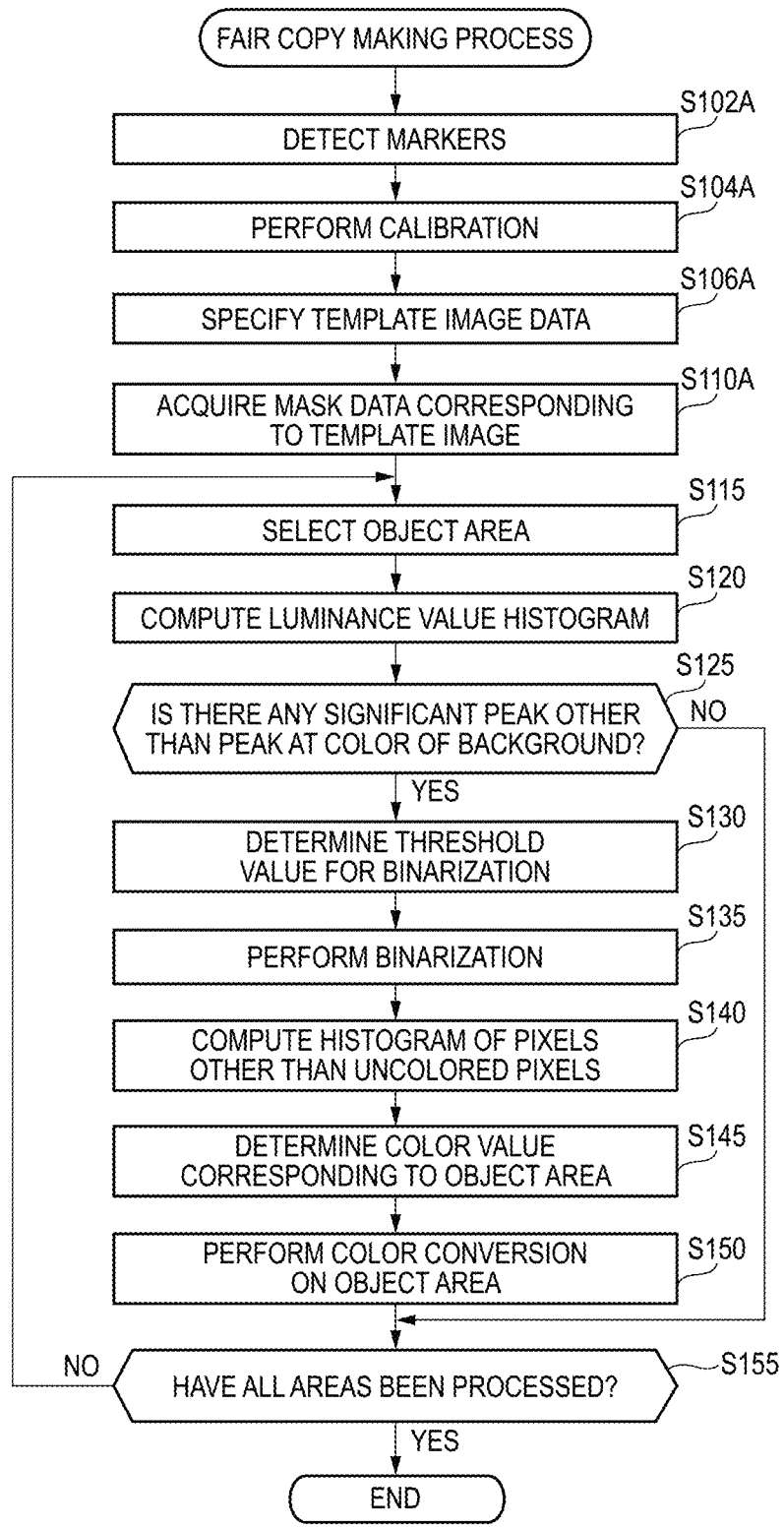
FIG. 13 is a flow chart illustrating a clean copy making process of the second embodiment.

A clean copy making process of the second embodiment includes processes different from those of the clean copy making process of the first embodiment. The operation of the image processing system of the second embodiment is the same as the operation (FIG. 3 and the like) of the image processing system 1000 of the first embodiment, except for the clean copy making process. FIG. 13 is a flow chart illustrating the clean copy making process of the second embodiment.

In Step S102A, the CPU 410 analyzes scan data, thereby detecting the markers MK which included in the scan image and is represented by the scan data. The scan data is generated by optically reading a document having the template image 50 of FIG. 11 printed thereon. Therefore, a scan image (not shown) of the second embodiment includes an image representing the template image 50 of FIG. 11. Therefore, in the scan image, the markers MK and the barcode BC exist. Since the CPU 410 knows the positions where the markers MK have been disposed, specifically, the positions of the vicinities of the three corners of the scan image, the CPU 410 can easily detect the markers MK by analyzing the positions where the markers MK have been disposed.

In Step S104A, the CPU 410 performs calibration on the scan image. Specifically, a scaling process of adjusting the size of the scan image and a rotating process of adjusting the inclination of the scan image are performed such that the positions of the markers MK included in the scan image and detected in Step S102A and the positions of corresponding markers MK included in the mask image 60 match with each other at the pixel level. At this time, a template image data kind corresponding to the scan data has not been specified. However, in the present embodiment, the positions of the markers MK are common to template images which are represented by all template image data included in the template image data group 432. Therefore, the CPU 410 can appropriately perform the processes of Steps S102A and S104A. As the calibration result, it becomes possible to accurately recognize the position of the template image 50 included in the scan image. That is, the CPU 410 can accurately recognize the correspondence relation between the areas included in the scan image and the areas included in the template image 50 (that is, the areas included in the mask image 60).

In Step S106A, the CPU 410 specifies a template image data corresponding to the scan data, from the plurality of template image data included in the template image data group 432. Specifically, the CPU 410 analyzes the barcode BC of the scan image, thereby acquiring the identifier of the template image data representing the template image 50 printed on the document which was the origin of the scan data. The CPU 410 specifies the template image data identified by the corresponding identifier, as a template image data corresponding to the scan data.

In Step S110A, the CPU 410 acquires a mask data corresponding to the specified template image data, from the non-volatile storage device 430. Since the scan image includes the template image 50 and the position of the template image 50 in the scan image can be accurately recognized by calibration, it is possible to specify process target areas of the scan image with reference to the mask data. Similarly to the first embodiment, the process target areas of the scan image include draft image areas A21 and A23 constituting closed curves, and areas A22, A24, and A25 surrounded by the closed curves (see FIG. 5). As can be seen from the above description, a mask data can be referred to as an area information representing the process target areas included in the scan image.

The processes of Step S115 and the subsequent steps of the clean copy making process of FIG. 13 are the same as the processes of Step S115 and the subsequent steps of the clean copy making process of FIG. 6, and thus will not be described.

According to the second embodiment described above, the CPU 410 specifies the template image data corresponding to the scan data and acquires the mask data corresponding to the specified template image data, thereby specifying the process target areas included in the scan image. As a result, the CPU 410 can easily specify an appropriate process target area for each template image data representing the template image 10 printed on the document which was the origin of the scan data. That is, according to the second embodiment, if the document having the template image 10 printed thereon is optically read, whereby the original scan data is generated, it is possible to more easily generate processed image data representing an attractive image using the original scan data.

C. Third Embodiment

Figure 14:
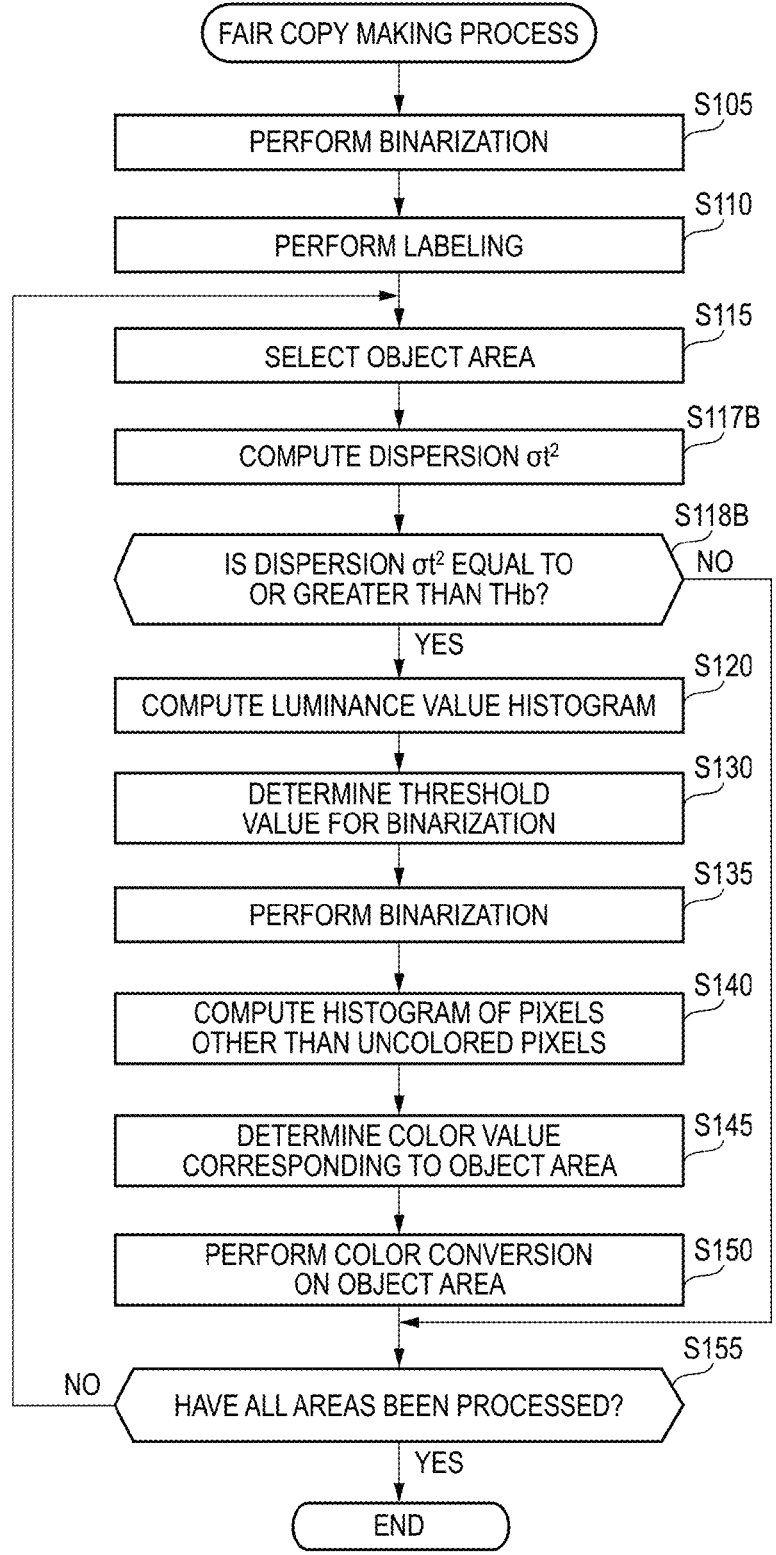
FIG. 14 is a flow chart illustrating a clean copy making process of a third embodiment.

A clean copy making process of a third embodiment includes processes different from those of the clean copy making process (FIG. 6) of the first embodiment. The others of the third embodiment are the same as those of the first embodiment. FIG. 14 is a flow chart illustrating the clean copy making process of the third embodiment.

The clean copy making process of the third embodiment of FIG. 14 additionally includes the processes of Steps S117B and S118B between Steps S115 and S120 of the clean copy making process of the first embodiment of FIG. 6. Also, the clean copy making process of the third embodiment of FIG. 14 does not include the process of Step S125 of the clean copy making process of the first embodiment of FIG. 6. The other steps of the clean copy making process of the third embodiment of FIG. 14 are identical to the steps of the clean copy making process of the first embodiment of FIG. 6 denoted by the same reference symbols.

In Step S117B, the CPU 410 computes the dispersion $\sigma_t^2$ of the values of the plurality of pixels included in the object area. The dispersion $\sigma_t^2$ is computed by the following Expression (1).

$$\sigma_t^2 = \sigma_R^2 + \sigma_G^2 + \sigma_B^2 \quad (1)$$

$$\sigma_R^2 = \frac{1}{n}\sum_{i=1}^{n}(Ri - Rave) \quad (2)$$

In Expression (1), $\sigma_R^2$, $\sigma_G^2$, and $\sigma_B^2$ are the dispersions of R values, G values, and B values included in the pixel values (R, G, and B values), respectively. The dispersion $\sigma_R^2$ of the R values of n-number of pixels (wherein n is an integer of 1 or greater) is computed by the above Expression (2). Rave represents the average value of the R values of the n-number of pixels.

In Step S118B, the CPU 410 determines whether the computed dispersion $\sigma_t^2$ is equal to or greater than a threshold value THb, or not. As described above, the colored areas A22, A24, and A26 (FIG. 5) are areas having color irregularity, and the draft image areas A21 and A23 and the uncolored areas A20 and A25 are substantially monochromic areas. Therefore, the dispersions $\sigma_t^2$ of the colored areas A22, A24, and A26 become larger than the dispersions $\sigma_t^2$ of the draft image areas A21 and A23 and the uncolored areas A20 and A25. For example, the threshold value THb is set to be larger than the dispersions $\sigma_t^2$ of the uncolored areas A20 and A25 and the dispersions $\sigma_t^2$ of the draft image areas A21 and A23 of FIGS. 5 and 8 and be smaller than the dispersions $\sigma_t^2$ of the colored areas A22, A24, and A26. As a result, in a case where the object area is a colored area, the dispersion $\sigma_t^2$ becomes equal to or larger than the threshold value THb, and in a case where the object area is a draft image area or an uncolored area, the dispersion $\sigma_t^2$ becomes smaller than the threshold value THb.

In a case where the dispersion $\sigma_t^2$ is equal to or larger than the threshold value THb ("YES" in Step S118B), in order to convert the colors of the target area, the CPU 410 performs the processes of Steps S120 to S150. Meanwhile, in a case where the dispersion $\sigma_t^2$ is smaller than the threshold value THb ("NO" in Step S118B), the CPU 410 skips the processes of Steps S120 to S150 so as not to convert the colors of the object area.

The dispersion $\sigma_t^2$ of the values of the plurality of pixels included in the object area can be referred to as a value representing the variance of the values of the plurality of pixels included in the object area. That is, in the third embodiment, on the basis of the variance of the values of a plurality of pixels included in each process target area, whether to perform color conversion on the corresponding area is determined. If it is determined to perform color conversion on the corresponding area, the colors of the corresponding area are converted to a color based on a corresponding color value. Meanwhile, if it is determined not to perform color conversion on the corresponding area, processed image data representing a processed image having unconverted colors is generated.

Therefore, on the basis of the variance of the values of a plurality of pixels included in each process target area, processed image data representing a processed image having been subjected to appropriate color conversion is generated. Specifically, the colors of the colored areas included in the scan image 20 are converted, and the colors of the uncolored areas and the draft image areas are not converted. As a result, it is possible to reduce a possibility that the colors of the uncolored areas and the colors of the draft image areas will be converted, whereby visual quality will decrease. For example, in a case where letters are written on an uncolored area, it is possible to suppress the corresponding letters, patterns of the draft image areas, and the like from being deleted. Therefore, with respect to some kinds of template images 10, the clean copy making process of the third embodiment may be preferable to the clean copy making process of the first embodiment.

Also, a value representing the variance of the values of a plurality of pixels is not limited to a dispersion $\sigma_r^2$, and a standard deviation, an edge quantity, a difference between the maximum value and the minimum value, or the like may be used.

D. Fourth Embodiment

Figure 15A:
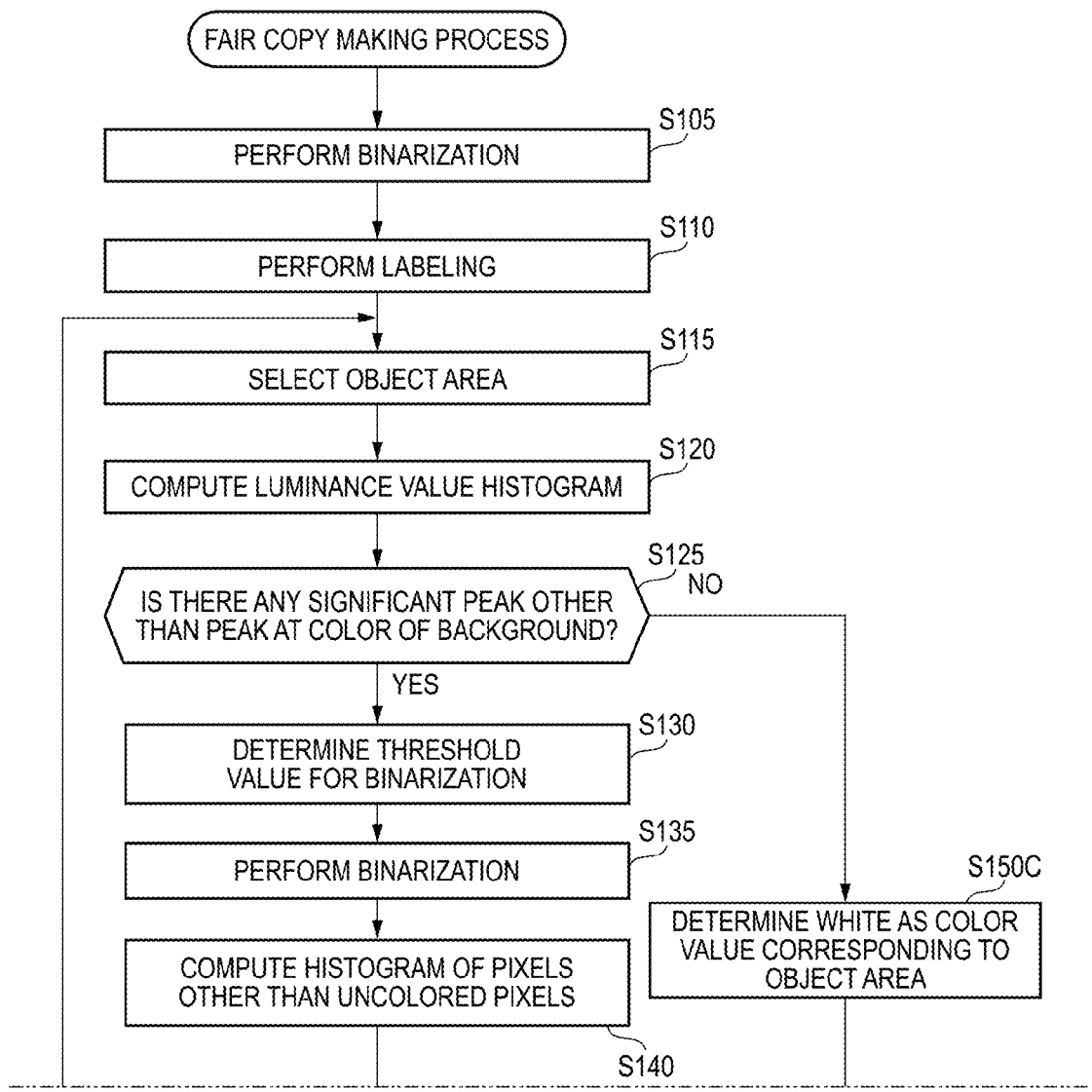
FIGS. 15A and 15B are flow charts illustrating a clean copy making process of a fourth embodiment.
Figure 15B:
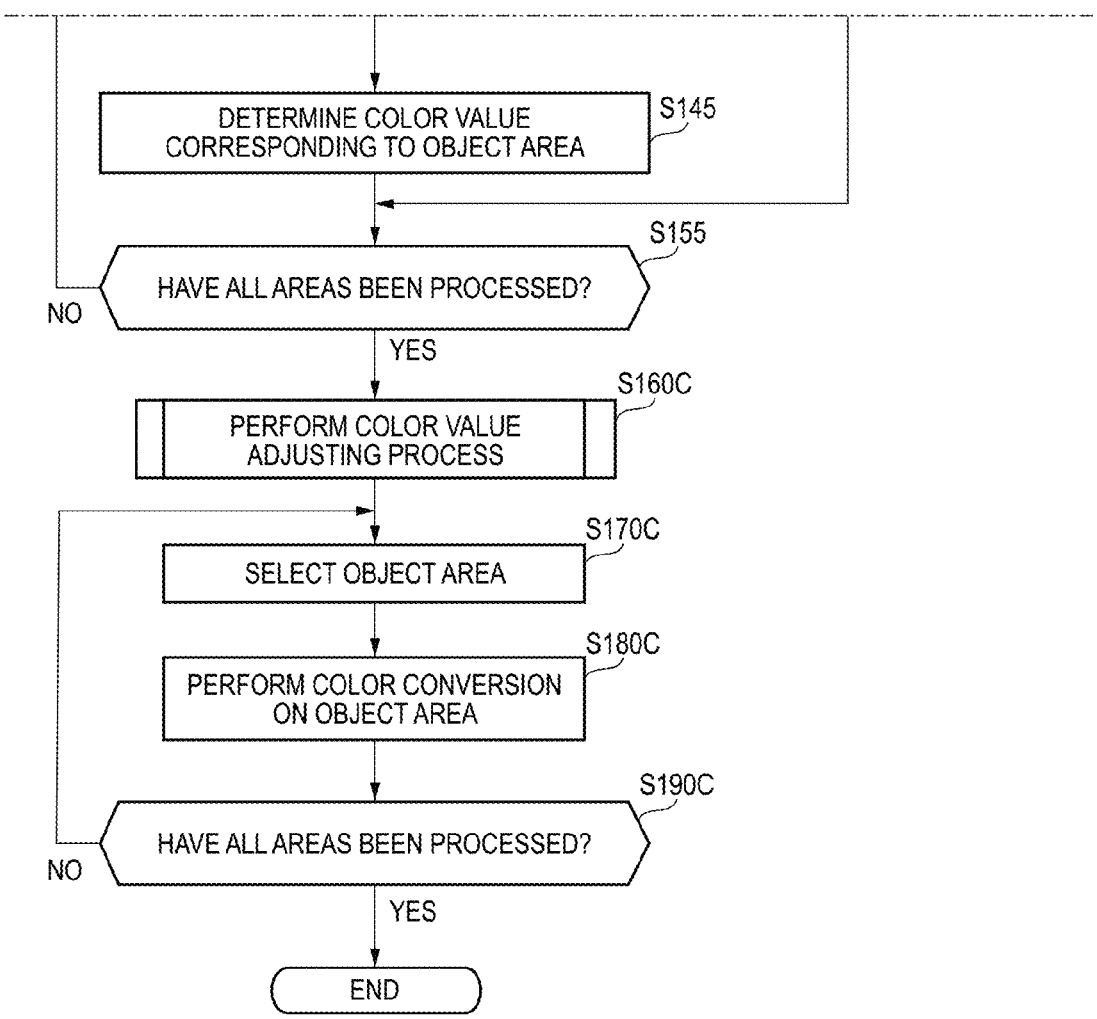

A clean copy making process of a fourth embodiment includes processes different from those of the clean copy making process (FIG. 6) of the first embodiment. The others of the fourth embodiment are identical to those of the first embodiment. FIGS. 15A and 15B are flow charts illustrating the clean copy making process of the fourth embodiment.

The processes of Steps S105 to S145 of the clean copy making process of the fourth embodiment of FIGS. 15A and 15B are identical to the steps of the clean copy making process of the first embodiment of FIG. 6 denoted by the same reference symbols. In the clean copy making process of the fourth embodiment, in a case where it is determined in Step S125 that there is no significant peak other than the peak at the color of the background ("NO" in Step S125), in Step S150C, the CPU 410 determines a color value corresponding to the object area to the color of the background (white in the present embodiment).

Further, in the clean copy making process of the fourth embodiment, immediately after Step S145, the CPU 410 does not perform color conversion (Step S150 of FIG. 6) on the object area. Furthermore, in a case where color values corresponding to all process target areas are determined ("YES" in Step S155), in Step S160C, the CPU 410 performs a color value adjusting process.

Figure 16:
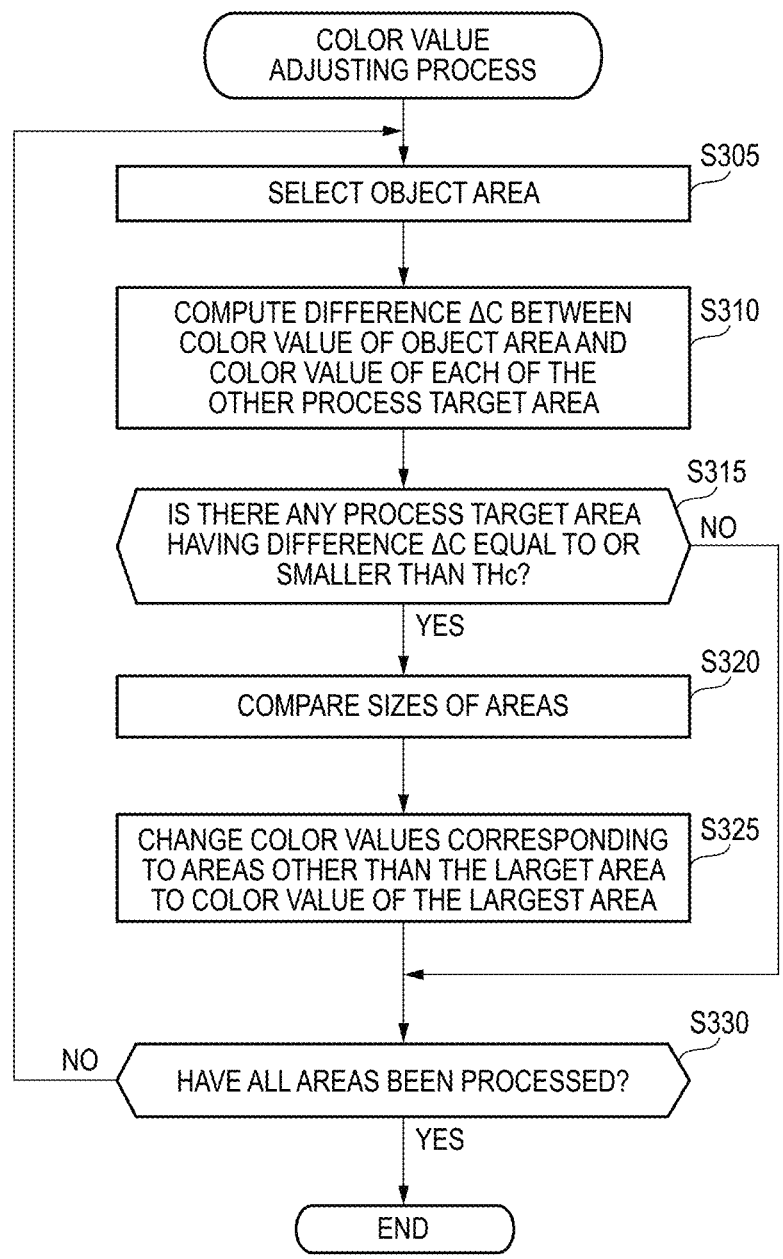
FIG. 16 is a flow chart illustrating a color value adjusting process.

FIG. 16 is a flow chart illustrating the color value adjusting process. In a case where a plurality of color values corresponding to a plurality of process target areas includes color values representing colors close to each other, the plurality of color values representing colors close to each other are adjusted to the same value. This process is called the color value adjusting process.

In Step S305, the CPU 410 selects an object area from the plurality of process target areas included in the scan image 20. In Step S310, the CPU 410 computes a difference $\Delta C$ between a color value corresponding to the object area and a color value corresponding to each of the other process target areas. It is assumed that a difference $\Delta C$ between color values (R1, G1, B1) and (R2, G2, B2) is computed. The difference $\Delta C$ is represented by the sum of the absolute values of three kinds of component value differences. That is, the difference $\Delta C$ is represented by the sum of the absolute value of (R1−R2), the absolute value of (G1−G2), and the absolute value of (B1−B2). Alternatively, as the difference $\Delta C$, the Euclidean distance between the color values (R1, G1, B1) and (R2, G2, B2) may be used.

In Step S315, the CPU 410 determines whether the difference $\Delta C$ of at least one of the plurality of other process target areas is equal to or smaller than a threshold value THc, or not. However, an area having a difference $\Delta C$ of 0, that is, an area associated with the same color value as the color value corresponding to the object area is not considered.

In a case where at least one area has a difference $\Delta C$ equal to or smaller than the threshold value THc ("YES" in Step S315), in Step S320, the CPU 410 compares the size of the object area with the size of the at least one area having a difference $\Delta C$ equal to or smaller than threshold value THc. Specifically, the CPU 410 compares the number of pixels of the object area with the number of pixels of the at least one area having a difference $\Delta C$ equal to or smaller than the threshold value THc.

If the plurality of areas is compared whereby the largest area is determined, in Step S325, the CPU 410 changes color values corresponding to areas other than the largest area to the color value of the largest area. That is, the plurality of color values corresponding to the plurality of areas compared is unified to the color value corresponding to the area having the largest number of pixels. Also, the CPU 410 may compute an arithmetic weighted mean of a plurality of color values corresponding to a plurality of areas requiring of unifying of color value and may unify the plurality of color values corresponding to the plurality of areas to the computed arithmetic weighted mean. As a weight for each color value, for example, a weight according to the number of pixels of an area corresponding to the corresponding color value can be used.

In a case where there is no area having a difference $\Delta C$ equal to or smaller than the threshold value THc ("NO" in Step S315), the CPU 410 skips the processes of Steps S320 and S325, and proceeds to the process of Step S330.

In Step S330, the CPU 410 determines whether all process target areas included in the scan image 20 have been processed as object areas. In a case where there is a unprocessed area ("NO" in Step S330), the CPU 410 returns to Step S305 in which the CPU 410 selects the unprocessed area as an object area. In a case where all process target areas have been processed ("YES" in Step S330), the CPU 410 finishes the color value adjusting process.

In Step S170C of FIG. 15, the CPU 410 selects an object area from the plurality of process target areas included in the scan image 20. In Step S180C, the CPU 410 performs a process identical to Step S150 of FIG. 6, thereby converting the colors of the object area. In Step S19C, the CPU 410 determines whether all process target areas included in the scan image 20 have been processed as object areas. In a case where there is a unprocessed area ("NO" in Step S190C), the CPU 410 returns to Step S170C in which the CPU 410 selects the unprocessed area as an object area. In a case where all process target areas have been processed ("YES" in Step S190C), the CPU 410 finishes the clean copy making process.

According to the fourth embodiment described above, the visual quality of the processed image can be further improved.

For example, a case where the scan image 20 of FIG. 5 is a process target is considered. In the enlarged portion 20W2 of FIG. 5, the draft image 24 includes the colored areas A26 and A24, which represent a face portion and a left-ear portion of the character, and are referred to as a first area and a second area, respectively. In this case, if a color value corresponding to the first area and a color value corresponding to the second area express colors close to each other, it can be considered that the user intended to color the two corresponding areas of the document with the same color. In this case, if the color of the first area and the color of the second area are converted into different colors, the user observing the processed image 40 may get a feeling of strangeness or get a feeling that the visual quality of the processed image 40 is different from desired visual quality.

The same applies, for example, to the plurality of colored areas of the insides of the plurality of letters of the draft image 23. Also, the same applies to the colored areas of the right-foot portion and left-foot portion of the character represented by the draft image 24.

According to the present embodiment, in a case where the color value corresponding to the first area and the color value corresponding to the second area express colors close to each other, the color of the first area and the color of the second area are converted into the same color (that is, a color based on at least one color of the color of the first area and the color of the second area). Therefore, it is possible to generate processed image data representing a processed image including the colored areas having colors having been more appropriately converted. As a result, the visual quality of the processed image can be further improved.

B. Modifications (1) In the clean copy making process of each embodiment described above, the luminance value histogram and the R, G, and B value histograms, for example, the histograms of Steps S120 and S140 of FIG. 6 are computed using all pixels included in an object area. Alternatively, those histograms may be computed using some pixels appropriately selected from a plurality of pixels included in an object area. For example, those histograms may be computed using a plurality of pixels included in one or more raster lines transversely crossing the vicinity of the position of the longitudinal center of an object area.

Similarly, in the clean copy making process of the third embodiment, the dispersion $\sigma_r^2$ may be computed using some pixels appropriately selected from a plurality of pixels included in an object area.

(2) In the clean copy making process of each embodiment described above, on the basis of the mode values of R, G, and B value histograms (FIGS. 9A to 9C), a color value corresponding to an object area is determined (for example, Step S140 of FIG. 6). Alternatively, on the basis of the averages or medians of a plurality of pixel values which are computed from R, G, and B value histograms, a color value corresponding to an object area may be determined. Also, on the basis of a saturation value histogram or a hue value histogram instead of R, G, and B value histograms, a color value corresponding to an object area may be determined.

(3) In each embodiment described above, the colors of all pixels of colored areas of the insides of closed curves composed of draft-image constituting pixels are converted. However, it is not always needed to convert the colors of all pixels of colored areas. For example, among all pixels of each colored area, a number of pixels enough to decrease color irregularity of the corresponding colored area and improve visual quality may be subjected to color conversion.

(4) In the second embodiment described above, the CPU 410 detects the barcode BC included in the scan image 20 represented by the scan data, thereby specifying a template image data corresponding to the scan data (Step S106A of FIGS. 11 and 13). Alternatively, for example, in Step S25 of FIG. 3, the CPU 410 may store the template image data identifier transmitted to the multi-functional peripheral 200. In this case, with respect to the next template image 50, the CPU 410 may specify a template image data identified by the stored identifier, as a template image data corresponding to the scan data.

(5) In the second embodiment described above, as the area information for specifying a plurality of areas included in the scan image 20, the mask data representing the mask images 60 are used. However, the area information is not limited to the mask data. For example, the area information may be coordinate data each representing the positions of a plurality of apexes forming the outlines of draft images 53 and 54 included in a template image 50. Also, in the second embodiment described above, in advance, as the area informations, the mask data are generated for the template image data and are stored in the non-volatile storage device 430. However, for example, when the clean copy making process is performed, the CPU 410 may analyze the template image data, thereby generating the area informations. In this case, for example, even if a template image data generated or acquired by the user is used to generate a document, since the corresponding template image data is transmitted from the multi-functional peripheral 200 to the server 400, the CPU 410 can use the template image data to specify a plurality of areas included in the scan image 20.

(6) In each embodiment described above, the colors of all colored areas surrounded by the closed curves included in the scan image 20 are converted. Alternatively, only the colors of some colored areas may be converted. For example, in the mask data of the second embodiment, all areas surrounded by the closed curves may not be specified, and only some areas to be subjected to color conversion may be specified. For example, among all areas surrounded by closed curves included in a template image data, an area assigned for letter writing may be excluded from areas to be subjected to color conversion. In this case, it is possible to reduce a possibility that letters in the scan image 20 will be deleted by the clean copy making process.

(7) In each embodiment described above, the values of the pixels included in the scan data are changed, whereby the processed image data is generated. Alternatively, the CPU 410 changes the pixel values of the template image data corresponding to the scan data, thereby generating the processed image data. Even in this case, the scan data can be used to determine color values corresponding to conversion target areas. Even in this case, consequentially, the CPU 410 can convert the colors of the colored areas included in the scan image represented by the scan data into colors based on the color values corresponding to the corresponding colored areas, thereby generating the image data representing the processed image.

(8) As the differences ΔC which are used in the fourth embodiment, instead of R, G, and B component differences, luminance value differences or hue value differences may be used. For example, with respect to the document, differences according to color irregularity of a plurality of areas colored with the same colored pencil or marker pen may reduce saturation value differences and hue value differences, as compared to luminance value differences or brightness value differences. In this case, it is possible to accurately convert the colors of the areas colored with the same colored pencil or marker pen, into the same color.

(9) In each embodiment described above, the multi-functional peripheral 200 uses the template image data acquired from the server 400 to print the template image 10 on a paper sheet, and the paper sheet having the template image 10 printed thereon is supplied to the user. Alternatively, the user can purchase the paper sheet having the template image 10 printed thereon.

(10) The processes (for example, the processes of Step S25 and Steps S42 to S55 of FIG. 3) which are performed by the CPU 410 of the server 400 in the embodiments described above may be performed, for example, by the CPU 210 of the multi-functional peripheral 200. In this case, the server 400 is unnecessary, and the multi-functional peripheral 200 may perform the processes of FIG. 3 on its own. Also, the processes which are performed by the CPU 410 of the server 400 may be performed a CPU (not shown) of the personal computer 500 (FIG. 1) connected to the multi-functional peripheral 200. For example, the CPU of the personal computer 500 may execute a scanner driver program installed in the personal computer 500, thereby performing those processes. Also, the server 400 may be composed of one computer like in the embodiments, or may be configured by a computing system including a plurality of computers.

(11) In the embodiments described above, some of components implemented by hardware may be replaced with software, and conversely, some of components implemented by software may be replaced with hardware.

What is claimed is:

1. An image processing apparatus comprising a controller configured to perform:
   acquiring original image data representing an original image, the original image data being acquired from an image inputting device;
   specifying a plurality of target areas, which is included in the original image and includes a first target area and a second target area, wherein the first target area includes background pixels and first colored pixels, the background pixels representing a background color of the original image, the first colored pixels representing colors different from the background color, wherein the second target area includes the background pixels and second colored pixels, the second colored pixels representing colors different from the background color;
   determining pixel values of first colored pixels, respectively, the pixel value representing a color of the first colored pixel;
   determining a first conversion pixel value based on the pixel values of the first colored pixels, wherein the first conversion pixel value is to be applied for every pixel in the first target area;
   determining pixel values of second colored pixels, respectively, the pixel value representing a color of the second colored pixel;
   determining a second conversion pixel value based on the pixel values of the second colored pixels, wherein the second conversion pixel value is to be applied for every pixel in the second target area, the second conversion pixel value being different from the first conversion pixel value;
   converting the pixel value of every pixel included in each of the first target area and the second target area into each of the respective first conversion pixel value and the second conversion pixel value so that the colors in each respective target area become uniform and generating processed image data representing a processed image; and
   communicating, to an image outputting device, the processed image data.

2. The image processing apparatus according to claim 1, wherein the controller is further configured to perform:
   classifying a plurality of pixels included in the original image data on the basis of the pixel values of the pixels,
   wherein, in the specifying the plurality of the target areas, an area composed of a plurality of successive pixels classified into the same kind is specified as an identical area, and
   wherein, in the determining, each of the first conversion pixel value and the second conversion pixel value for expressing a color to be associated with the corresponding target area, respectively, is determined.

3. The image processing apparatus according to claim 1, wherein the controller is further configured to perform:
   specifying a template image data corresponding to the original image data; and
   specifying the plurality of the target areas by acquiring an area information, which represents each of the plurality of target areas and is generated for each of the template image data,
   wherein, in the determining, each of the first conversion pixel value and the second conversion pixel value for expressing a color to be associated with the corresponding target area, respectively, is determined.

4. The image processing apparatus according to claim 3:
   wherein the original image data is generated by optically reading a document having a template image, which is printed thereon and is represented by the template image data, and
   wherein the area information is information representing a plurality of areas included in the template image corresponding to the plurality of target areas included in the original image.

5. The image processing apparatus according to claim 1, further comprising:
   a mode selecting unit that allows a user to select any one of a plurality of modes including a first mode and a second mode,
   wherein in a case where the first mode is selected, the processed image data is generated, and the processed image data is output, and
   wherein in a case where the second mode is selected, the processed image data is not generated.

6. The image processing apparatus according to claim 1, wherein the controller, in the determining, computes a histogram of at least a part of the pixel values included in the respective target areas, and
   wherein, based on the computed histogram, each of the first conversion pixel value and the second conversion pixel value for expressing a color to be associated with the corresponding target area is determined.

7. The image processing apparatus according to claim 6, wherein the controller, in the determining, computes based upon each histogram a mode value, and
   wherein each of the first conversion pixel value and the second conversion pixel value is determined, based on each mode value computed at the respective target area.

8. The image processing apparatus according to claim 1, wherein the controller is further configured to perform:
   determining whether to perform color conversion on each respective target area based on a variance of a plurality of the pixel values included in the corresponding target area;
   for each target area for which it is determined to perform the color conversion:
      generating the processed image data representing the processed image, in which the pixel values of pixels are converted into a color based on a pixel value associated with the corresponding target area; and for each target area for which it is determined not to perform the color conversion:
not generating the processed image data representing the processed image.

9. The image processing apparatus according to claim 1, wherein, based on the pixel values of pixels constituting each of the first and second target areas except for the pixels representing the background color, each of the first conversion pixel value and the second conversion pixel value for expressing a color to be associated with the corresponding target area is determined.

10. The image processing apparatus according to claim 1, wherein the controller is further configured to perform:
generating, in a case where color values determined for expressing colors to be associated with the first target area and the second target area represent colors close to each other, processed image data representing the processed image in which the pixel values of pixels included in the first target area and the pixel values of pixels included in the second target area are converted into the same pixel value.

11. The image processing apparatus according to claim 1, wherein the controller is further configured to perform:
controlling a printing performance unit such that the printing performance unit prints a template image represented by a template image data;
acquiring the original image data by optically reading a document on which a user colors the printed template image; and
generating the processed image data, in which the values of pixels included in the first target area are converted based on a color imparted to the first target area on the document by the user and the values of pixels included in the second target area are converted based on the color imparted to the second target area on the document by the user.

12. The image processing apparatus according to claim 4, wherein the controller is further configured to perform receiving the template image data from a server.

13. A non-transitory computer-readable medium having instructions to control an image processing apparatus to perform:
acquiring original image data representing an original image, the original image data being acquired from an image inputting device;
specifying a plurality of target areas, which is included in the original image and includes a first target area and a second target area, wherein the first target area includes background pixels and first colored pixels, the background pixels representing a background color of the original image, the first colored pixels representing colors different from the background color, wherein the second target area includes the background pixels and second colored pixels, the second colored pixels representing colors different from the background color;
determining pixel values of first colored pixels, respectively, the pixel value representing a color of the first colored pixel;
determining a first conversion pixel value based on the pixel values of the first colored pixels, wherein the first conversion pixel value is to be applied for every pixel in the first target area;
determining pixel values of second colored pixels, respectively, the pixel value representing a color of the second colored pixel;
determining a second conversion pixel value based on the pixel values of the second colored pixels, wherein the second conversion pixel value is to be applied for every pixel in the second target area, the second conversion pixel value being different from the first conversion pixel value;
converting the pixel value of every pixel included in each of the first target area and the second target area into each of the respective first conversion pixel value and the second conversion pixel value so that the colors in each respective target area become uniform and generating processed image data representing a processed image; and
communicating, to an image outputting device, the processed image data.

\* \* \* \* \*